United States Patent [19]
Kanno et al.

[11] Patent Number: 5,186,102
[45] Date of Patent: Feb. 16, 1993

[54] PRINTER USING A STENCIL

[75] Inventors: Hiroshi Kanno, Shiroishi; Yuuki Wagatsuma, Shibata; Toshiaki Takase, Sendai, all of Japan

[73] Assignee: Ricoh Company, Ltd., Tokyo, Japan

[21] Appl. No.: 773,211

[22] Filed: Oct. 9, 1991

[30] Foreign Application Priority Data

Oct. 11, 1990 [JP] Japan .................................. 2-272828
Nov. 26, 1990 [JP] Japan .................................. 2-321641

[51] Int. Cl.⁵ .......................... B41F 15/34; B41C 1/14
[52] U.S. Cl. .................................................. 101/128.4
[58] Field of Search ............... 101/116, 118, 119, 120, 101/128.4, 129; 355/202, 233, 234

[56] References Cited

U.S. PATENT DOCUMENTS 3,802,773 4/1974 Schneider.
4,350,997 9/1982 Yamada.
4,627,707 12/1986 Tani et al..
4,707,126 11/1987 Ohshima et al..

FOREIGN PATENT DOCUMENTS 2503405 4/1982 France.
47060 2/1990 Japan .................................. 101/128.4
2100093 12/1982 United Kingdom.
2203381 10/1988 United Kingdom.

OTHER PUBLICATIONS

Patent Abstracts of Japan vol. 12, No. 486 (E-695) Dec. 1988 & JP-A-63200673 (Toppan Printing Co Ltd) Aug. 18, 1988.

Primary Examiner—J. Reed Fisher
Attorney, Agent, or Firm—Oblon, Spivak, McClelland, Maier & Neustadt

[57] ABSTRACT

A printer using a stencil is disclosed which has a function of forming the images carried on a plurality of documents in any desired positions of a single stencil in combination. The printer also has a function of printing a document image in a desired position of a printing medium or sheet even when the image formed in a stencil is in a reduced or enlarged scale.

12 Claims, 22 Drawing Sheets

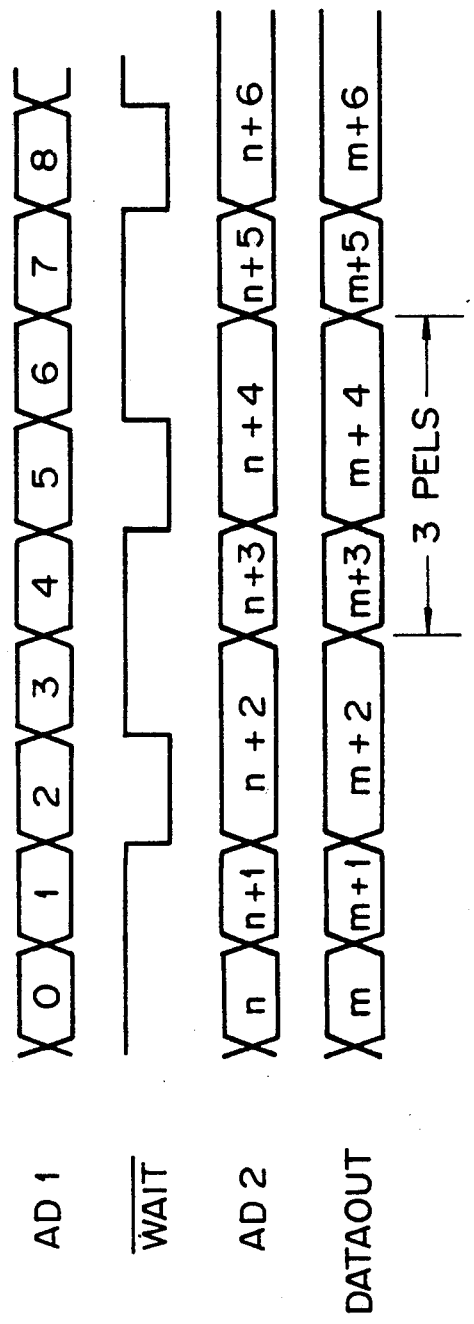

PRINTER USING A STENCIL

BACKGROUND OF THE INVENTION

The present invention relates to a printer using a stencil which has a function of forming images carried on a plurality of documents in desired positions of a stencil, and a function of printing out a document image in a desired position of a printing medium even when the image formed in a stencil is in a reduced or enlarged scale.

A stencil cutting device capable of forming image information read from a plurality of documents in a single stencil is conventional and used with a printer operable with a thermosensitive stencil. Such a stencil cutting device may be implemented with a stationary platen to be loaded with a document. In this kind of device, so long as a plurality of documents to be read have sizes lying in an allowable range, their images can be formed in a single stencil in combination. Alternatively, the stencil cutting machine may be used in combination with a work station or a personal computer so as to edit the images of a plurality of documents or plurality of data on a display. Then a single block copy will be produced and used to cut a stencil. A block copy for cutting a stencil may be prepared by a traditional scissors-and-paste job, i.e., combining the images of a plurality of documents by paste and scissors. Apart from the editing scheme, a system is known in which a plurality of documents of relatively small size are arranged side by side and formed in a single stencil continuously, as disclosed in Japanese Patent Laid-Open Publication No. 21940/1990.

While the above-stated stationary platen scheme is capable of forming the images of a plurality of documents in a single stencil if their sizes are smaller than the maximum readable size, it cannot form images repetitively in a single stencil. The display scheme is not practicable unless the operator is an expert in the manipulation of a work station or a person computer. The scissors-and-paste scheme has a problem that when some document images have been accidentally omitted from the block copy, a new block copy has to be produced to repeat a stencil cutting operation. Further, the last-mentioned continuous cutting scheme is disadvantageous in that the maximum readable size is limited to the maximum stencil cutting size.

A printer capable of printing an image formed in a stencil in any desired position of a printing medium has also been proposed, as disclosed in, for example, Japanese Patent Laid-Open Publication No. 247164/1989. This type of printer reads the image of a document while transporting the document by document moving means to thereby cut a stencil, and prints out the image on a printing medium by using the cut stencil. The operating timing of the document moving means is automatically shifted to reduce the margin at the leading edge of a document, thereby shifting the image upward. As a result, the image position is maintained constant throughout all the printings. This kind of approach, however, causes the image of a document to be located in an unexpected position on a stencil and, therefore, on a printing when the image formed in the stencil is in a reduced or enlarged scale.

SUMMARY OF THE INVENTION

It is, therefore, a first object of the present invention to provide a stencil cutting device for a printer using a stencil which allows image information read from a plurality of documents to be formed in desired positions of a single stencil.

It is another object of the present invention to provide a printer using a stencil which prints a document image in any desired position of a printing medium even when the image is changed in magnification.

In accordance with the present invention, a stencil cutting device for forming image information read from a plurality of documents in desired positions of a single stencil comprises a reading section for sequentially reading image information from a plurality of documents, a writing section for writing the image information read by the reading section in a stencil, a stencil moving section for moving the stencil in the subscanning direction, a displaying section having a display for displaying a write start position where the image information read by the reading section begins to be written in the stencil and an area of the stencil where a writing operation is under way, a marking section for selecting and designating the write start position on an operation board, and a control section for controlling the reading section, writing section, displaying section and stencil moving section such that a writing operation is repetitively effected a desired number of times in desired positions of the stencil.

Also, in accordance with the present invention, a printer for reading image information from a document, writing the image information in a stencil by cutting the stencil, and printing out the image information in a predetermined position of a recording medium by the stencil having been cut comprises a marking section for marking a desired point on a document as a first observed point, and a position where the first observed point should be reproduced on a printing as a second observed point, and an image moving section for moving an image carried on the document such that the pel of the first observed point on the document coincides with the pel of the second observed point on the printing.

BRIEF DESCRIPTION OF THE DRAWINGS

The above and other objects, features and advantages of the present invention will become more apparent from the following detailed description taken with the accompanying drawings in which:

FIG. 16A and 16B are timing charts demonstrating the operation of the magnification changing section shown in FIG. 15;

DESCRIPTION OF THE PREFERRED EMBODIMENTS

Preferred embodiments of the present invention will be described with reference to the accompanying drawings.

FIRST EMBODIMENT

Figure 1:
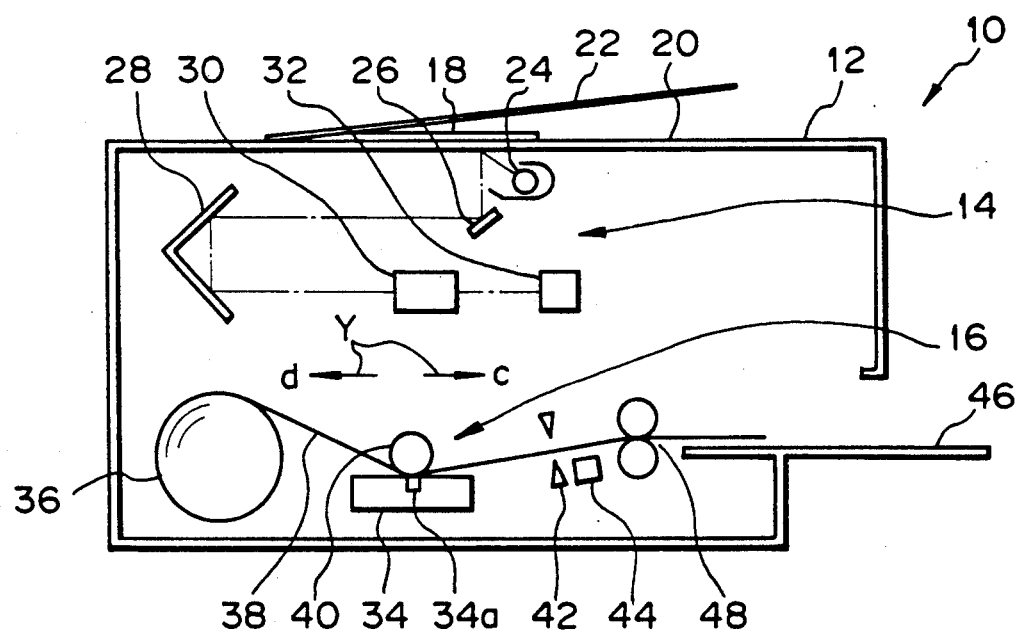
FIG. 1 is a section showing a stencil cutting device representative of a first embodiment of the present invention.

Referring to FIGS. 1, 2 3A–3E, 4A, 5A and 5B, a first embodiment pertains to a stencil cutting device with which the previously stated first object of the invention is attainable, i.e., a device capable of forming image information read from a plurality of documents in any desired positions of a single stencil. As shown in FIG. 1, the stencil cutting device, generally 10, has a housing 12, a reading section 14 disposed in an upper portion of the housing 12, and a writing section 16 disposed in a lower portion of the housing 12. A transparent platen 20 is provided on the top of the housing 12 to be loaded with a document 18. A presser plate or cover 22 is hinged to the housing 12 to be movable toward the platen 20 for pressing the document 18 from above. A mirror 26 is positioned below the platen 20 and movable together with a light source 24 along the platen 20. A reversal mirror 28 is movable in synchronism with the mirror 26. An image wise reflection from the document 18 is sequentially reflected by the mirrors 26 and 28. A lens 30 and a CCD (Charge Coupled Device) image sensor 32 are sequentially arranged on the optical path along which the reflection is propagated. As shown, the reading means 14 includes mirrors 26, 28; CCD image sensor 32; light source 24; and associated optics well known in the art of image forming apparatuses. In the writing section 16, a thermal head 34 having a heating section 34a is located in a lower portion of the housing 12. A stencil roll 36 is positioned upstream of the thermal head 34. A platen roller 40, which serves as a stencil moving means, is situated above the heating section 34a of the head 34. The platen roller 40 pulls out a webbing of stencil 38 from the roll 36 and transports it while pressing it against the heating section 34a. The writing means thus includes stencil roll 36, stencil 38, platen roller 40, thermal head 34, heating section 34a, and associated circuitry well known in the art. A cutter 42 for cutting the stencil 38 at a predetermined length, a sensor responsive to the trailing edge of the cut length of stencil 38, i.e., a master sheet, and a roller pair 48 for driving the master sheet to a tray 46 are arranged in this order downstream of the head 34.

Figure 2:
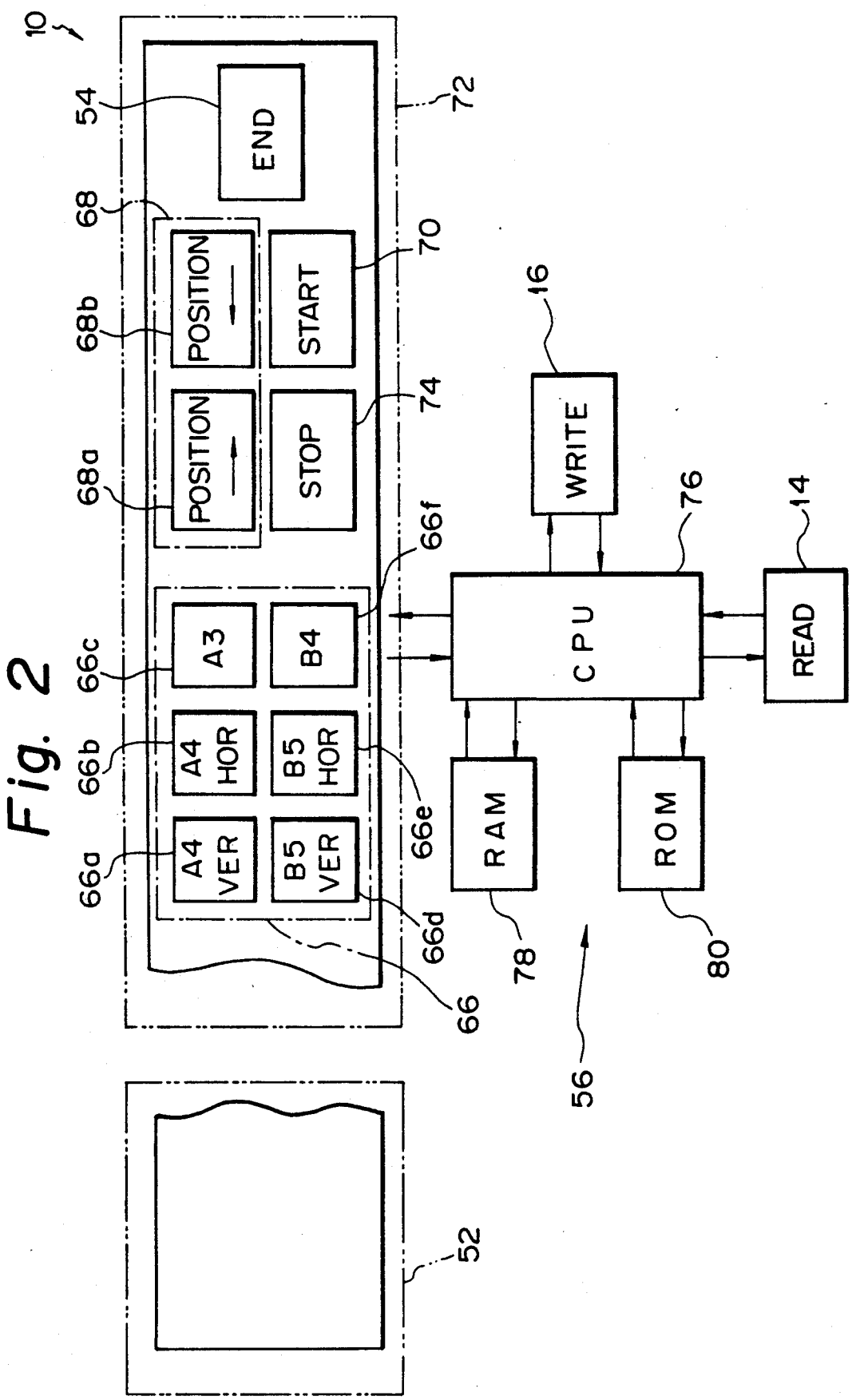
FIG. 2 shows the electric arrangement of the embodiment.

As shown in FIG. 2, an electric arrangement installed in the device 10 has a display 52 which displays information as instructed by displaying means, an operating section 54 for entering commands via commanding means, stencil moving means, not shown, stencil speed switching means, not shown, and a control means, which includes controller 56 for controlling the operations of the entire device 10 by control means. As shown in FIGS. 3A–3E, the display 52 has a mark in the form of a pentagram 60 which is movable in a frame 58, a scale 62 for displaying the size of the stencil 38, and a lamp 64 which turns on the completion of a writing operation. The displaying means displays a write start position and an area being processed on the display 52. The operating section 72 has stencil size keys 66 made up of a key 66a for selecting an A4 size vertical writing mode, a key 66b for selecting an A4 size horizontal writing mode, a key 66c for selecting an A3 size, a key 66d for selecting a B5 size vertical writing mode, a key 66e for selecting a B5 size horizontal writing mode, and a key 66f for selecting a B4 size. In addition, the operating section 72 has marking means which include shift keys 68, i.e., a key 68a for moving the mark 60 of the display 52 in a direction a, FIGS. 3A and 3B, and a key 68b for moving it in a direction b, FIGS. 3B and 3D, a start key 70, an end key 54, and a stop key 74. The position for starting writing information in a stencil is designated by the designating means.

The stencil moving means causes the platen roller 40 to move the stencil 38 to a position designated by the designating means in a subscanning direction Y which is perpendicular to a main scanning direction X. The stencil speed switching means causes the stencil moving means, i.e., the platen roller 40 to operate in either one of a high-speed feed mode and a write speed mode. The high-speed feed mode is selected to move the stencil 38 at least to a write start position, while the write speed mode is selected when a writing operation is under way. The controller 56 has a CPU 76 for controlling the operations of the entire device 10, a RAM 78, and a ROM 80. In response to a command from the control means, the controller 56 causes a stencil cutting operation to be repeated a desired number of times in desired positions of a single stencil 38.

Figure 4A:
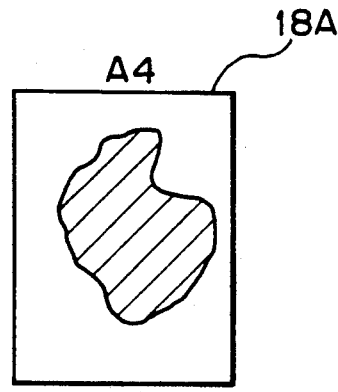
FIGS. 4A and 4B each shows a particular document.
Figure 4B:
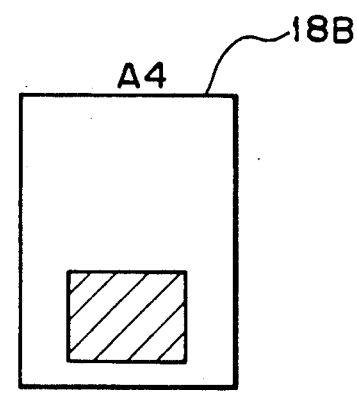

As shown in FIGS. 4A and 4B, assume two documents 18A and 18B each carrying a particular image at a particular position thereof. The operation of the device 10 will be described on the assumption that the images of the documents 18A and 18B are sequentially written in a single stencil 38 of A3 size, FIGS. 5A and 5B, in this order, the former in the right part and the latter in the left part.

Figure 3A:
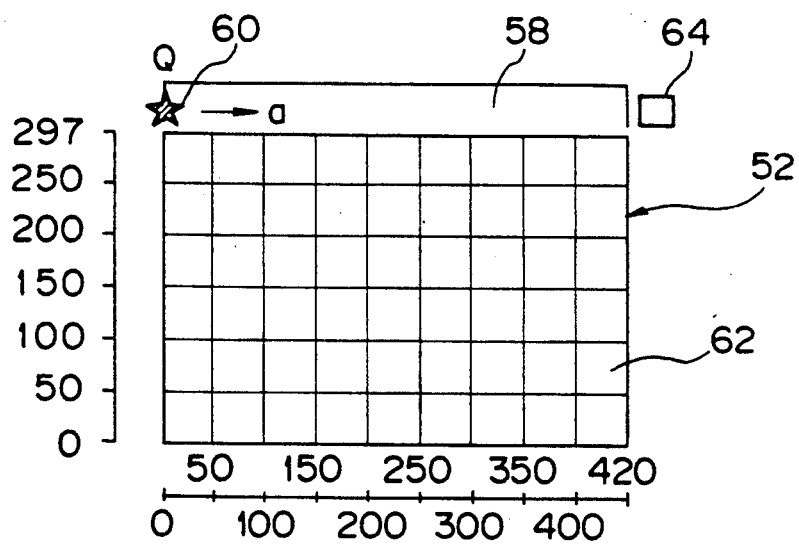
FIG. 3A-3E are plan views showing a display included in the arrangement of FIG. 2.
Figure 3B:
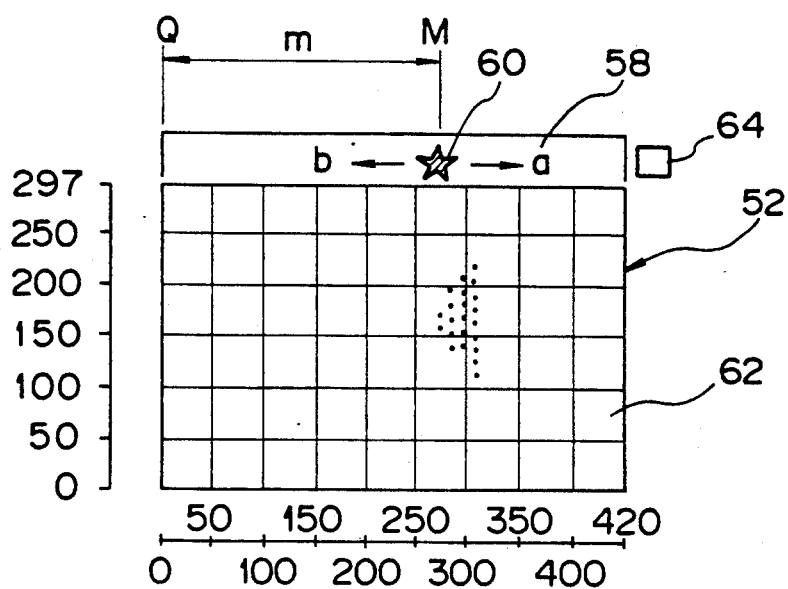
Figure 3C:
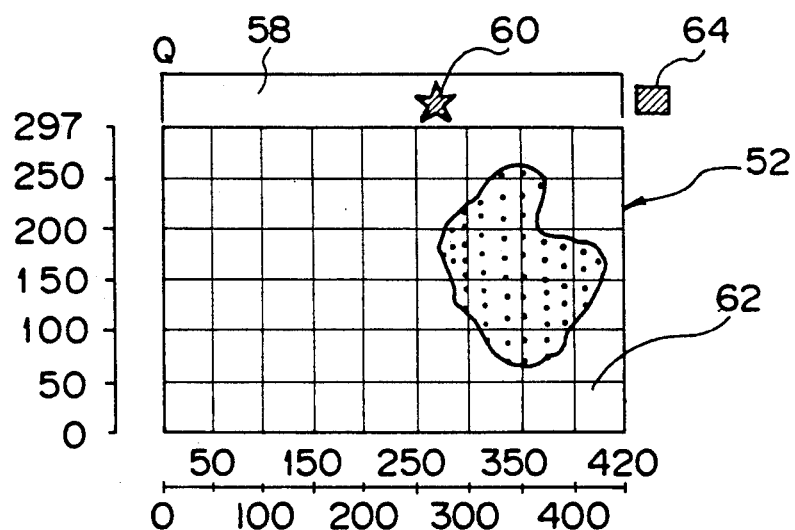
Figure 5A:
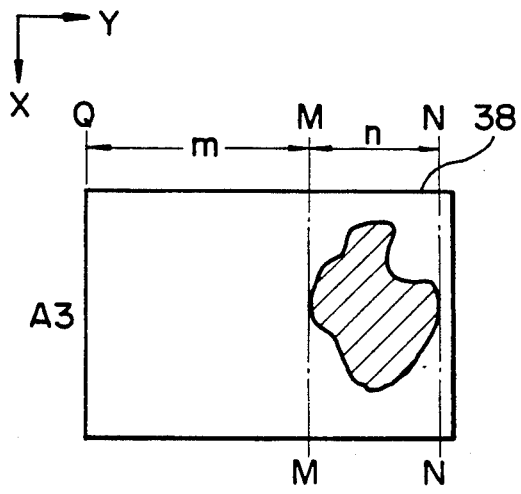
FIGS. 5A and 5B show a stencil.

First, a document 18A is laid on the platen 20, and then the A3 key 66c is pressed. As a result, an area corresponding to the A3 size is indicated on the scale 62 of the display 52 by bold lines. At this instant, the mark 60 is located at the origin Q within the frame 58. Assuming that the B4 key 66f is pressed, then an area corresponding to the B4 size will be indicated on the scale 62 by bold lines. Subsequently, a specific write start position M for starting writing the image of the document 18A is selected, and then the position key 68a is pressed to enter such a position, as shown in FIGS. 3B and 5A. Specifically, the position key 68a is continuously pressed until the mark 60 moves a distance m in terms of the scale in the direction a. The stencil speed switching means selects the high-speed feed mode in interlocked relation to the movement of the mark 60. Then, the platen roller 40 is rotated by the stencil moving means to drive the stencil 38 by the distance m in a direction c, FIG. 1. As soon as the stencil 38 is moved by the distance m, the mark 60 flashes to show that the device 10 is ready to write an image in the stencil 38.

As the start key 70 is pressed, the light source 24 scans the document 18A by light. The resulting reflection from the document 18A is routed through the mirrors 26 and 28 and lens 30 to the CCD image sensor 32. The image sensor 32 converts the incident light to an electric signal and sends it to the controller 56. The stencil speed switching means selects the write speed mode, and the platen roller 40 is rotated to transport the stencil 38 in the direction c in response to a command from the stencil moving means. At the same time, the heating section 34a of the thermal head 34 cuts the stencil 38 by heat to write the image of the document 18A in response to an electric signal from the controller 56. On the start of writing such an image, the displaying means causes the display 52 to start displaying the particular area, where the image is being written, by dots, as shown in FIG. 3B. When the image of the document 18A is fully written in the stencil 38, the stencil 38 is moved from the write start position M to a write end position N, FIG. 5A, by a distance n in the direction c. Then, the lamp 64 is turned on to show that the writing operation has completed.

Figure 3D:
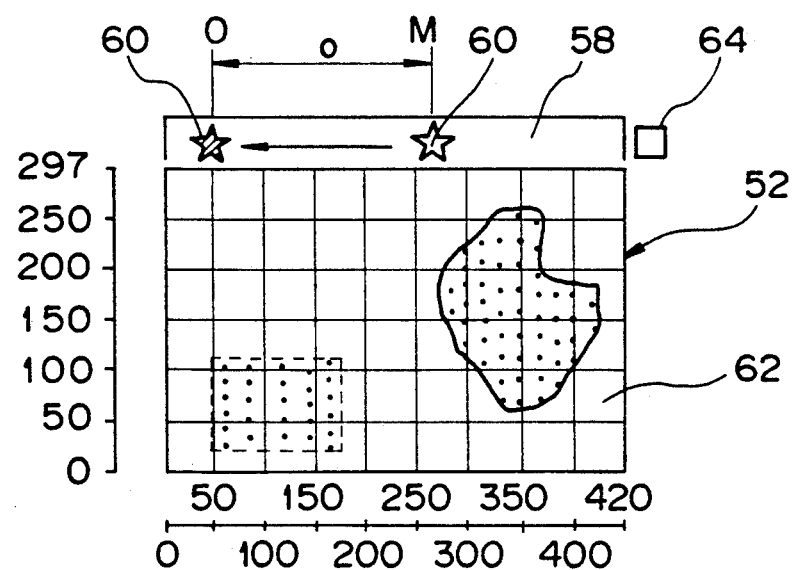
Figure 3E:
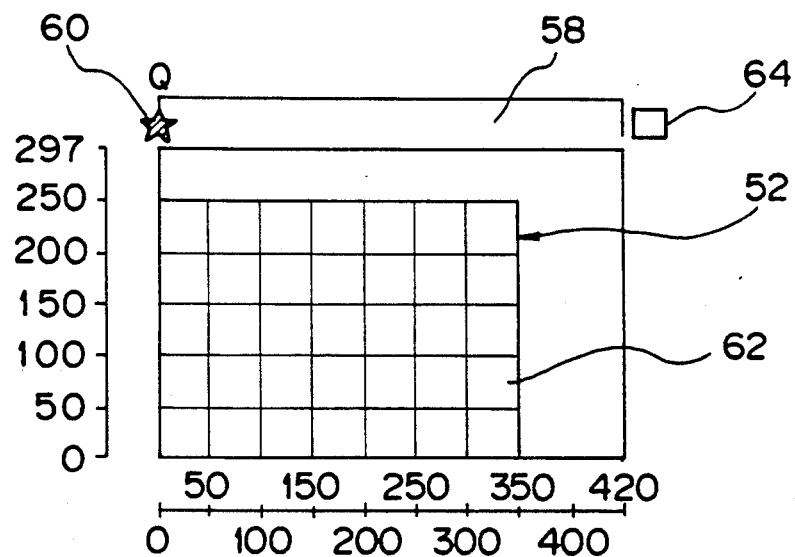
Figure 5B:
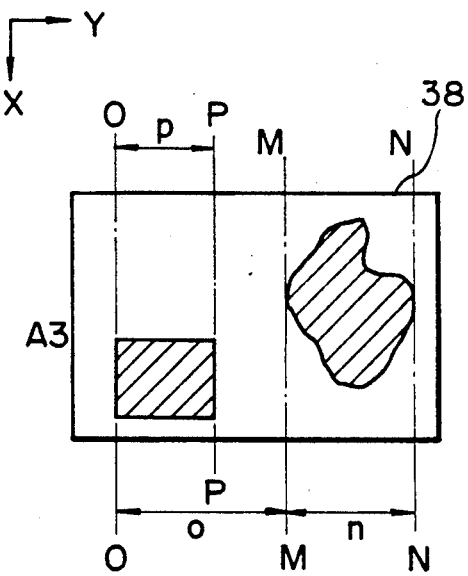

Thereafter, the document 18A is removed from the platen 20 and replaced with the other document 18B. At this instant, the size keys 66 remain in an OFF state. A specific write start position O is selected for the document 18B, and then the position key 68b is pressed, as shown in FIGS. 3D and 5B. Specifically, the position key 68b is continuously pressed until the mark 60 of the display 52 moves from the position M by a distance o in the direction b. Again, the stencil speed switching means selects the high-speed feed mode, and the platen roller 40 is rotated by the stencil moving means to move the stencil 38 from the position N by a distance (n+o) in the direction c. Then, the mark 60 flashes to show that the device 10 is ready to write an image in the stencil 38.

As the start key 70 is pressed, the light source 24 illuminates the document 18B. The resulting reflection from the document 18B is incident to the CCD image sensor 32 via the mirrors 26 and 28 and lens 30. The electric signal from the image sensor 32 is sent to the controller 56, as stated earlier. The stencil speed switching means selects the write speed mode, and the platen roller 40 is rotated by the stencil moving means to move the stencil 38 in a direction d, FIG. 1. At the same time, the heating section 34a again cuts the stencil 38 by heat to write the image of the document 18B in response to an electric signal from the controller 56. The displaying means causes the display 52 to start displaying the particular area associated with the document 18B by dots. When the stencil 38 is fully cut, the rotation of the platen roller 40 is stopped by the stencil moving means. As a result, the stencil 38 is brought to a stop at an end position P which is spaced apart from the start position O by a distance p. Finally, the lamp 64 is turned on to show the end of writing operation.

If further stencil cutting operations are not needed, the end key 72 on the operating section 54 is pressed. Then the stencil speed switching means selects the high-speed feed mode, and the platen roller 40 is rotated by the stencil moving means to drive the stencil 38 in the direction c over a distance corresponding to the A3 size. Then, the cutter 42 cuts the webbing 38 while the roller pair 48 transports the cut length of webbing 38 to the tray 46. As the sensor 44 senses the trailing edge of the cut stencil 38, the resulting output thereof is sent to the controller 56. In response, the controller 56 causes the control means to hold the rest of the stencil or webbing 38 in the standby position.

In the above-described manner, the embodiment allows the images of two documents 18A and 18B of A4 size to be formed in any desired positions of the stencil 38 of A3 size.

Figure 6:
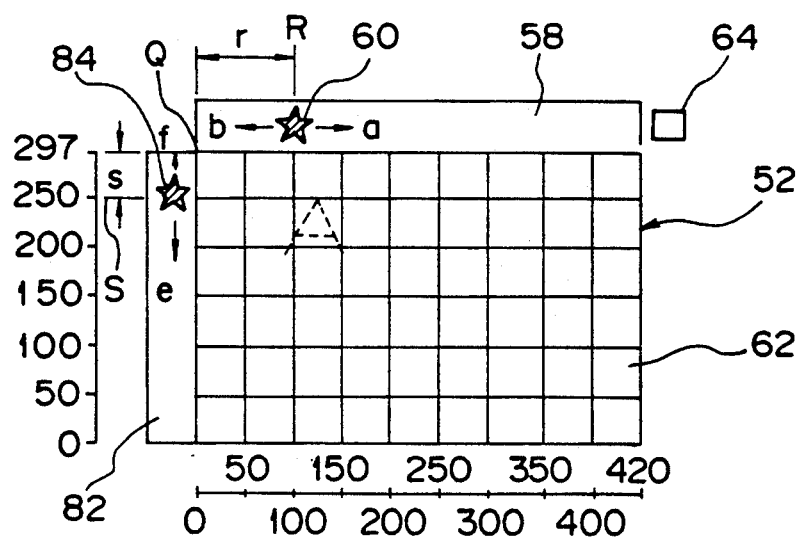
FIG. 6 is a plan view of the display included in the arrangement of FIG. 2.
Figure 7:
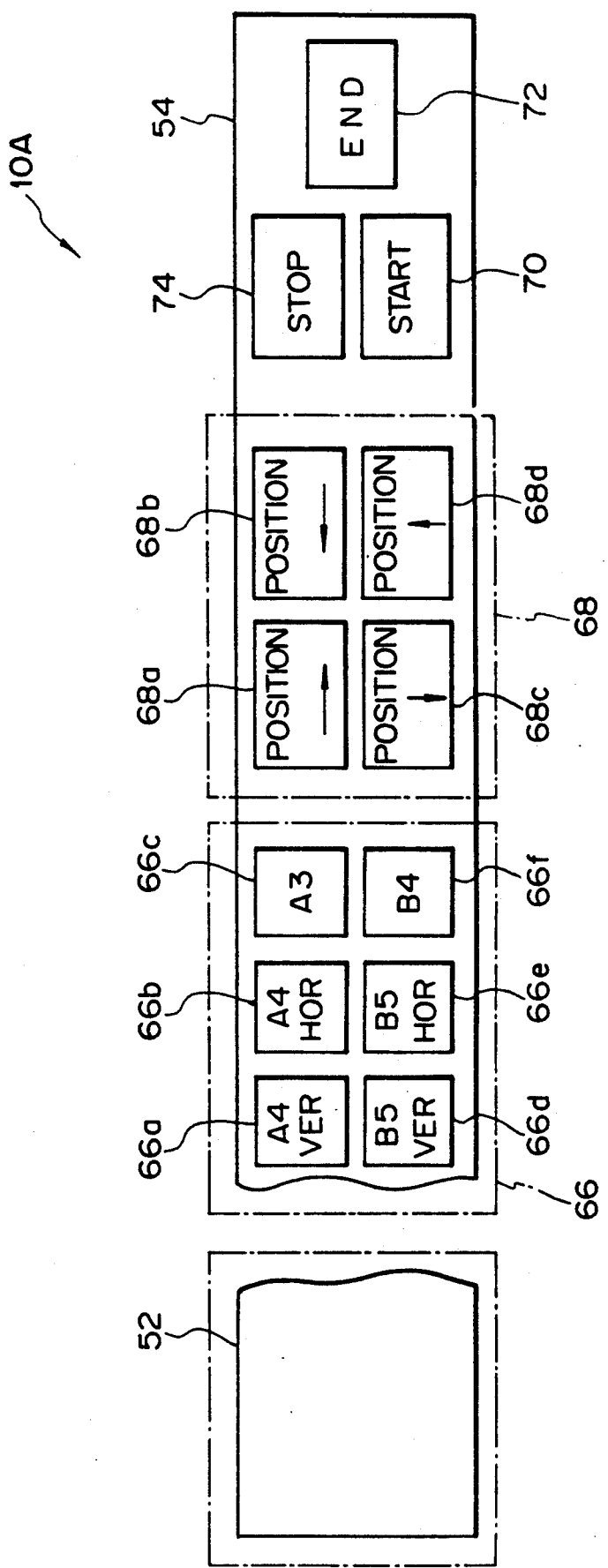
FIG. 7 is a plan view of an operation and display board with which a modification of the first embodiment is practicable.

A reference will be made to FIGS. 6, 7, 8A-8C, 9A and 9B for describing a modification of the first embodiment. As shown in FIG. 6, the display 52 has a second frame 62 and a second mark in the form of a pentagram 84 movable in the frame 62 in the vertical direction, in addition to the frame 58 and mark 60. The operating section 54 has additional position keys 68c and 68d for designating respectively a write start position in directions g and h, FIG. 9A, by the second mark 84.

Figure 8A:
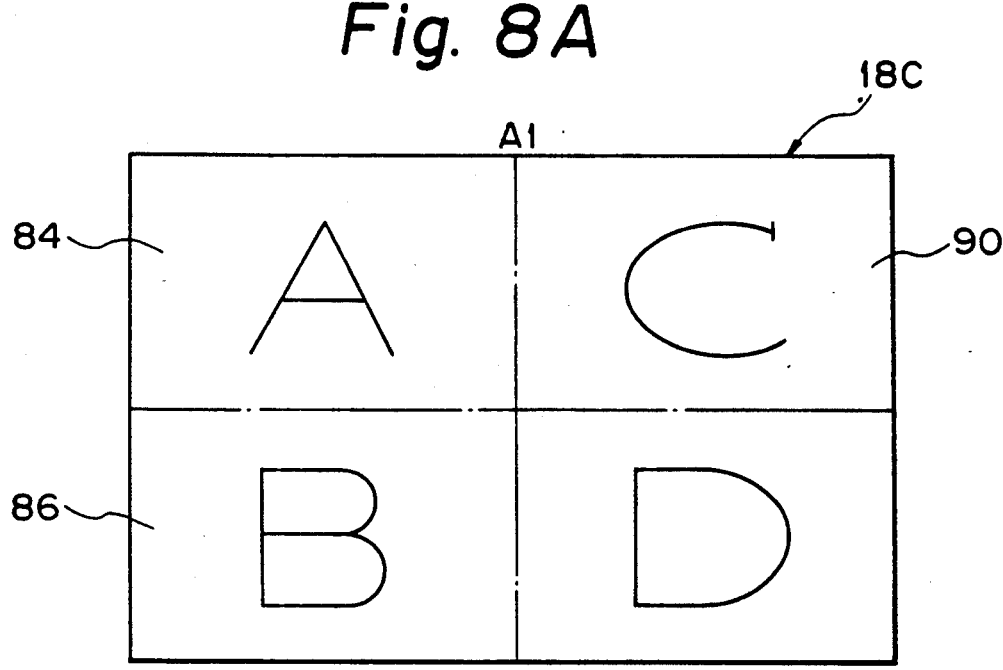
FIGS. 8A-8C show two documents and a clipping which may be combined on a stencil.
Figure 8B:
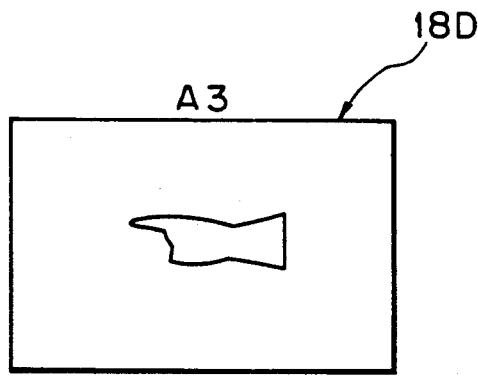
Figure 8C:
Figure 9A:
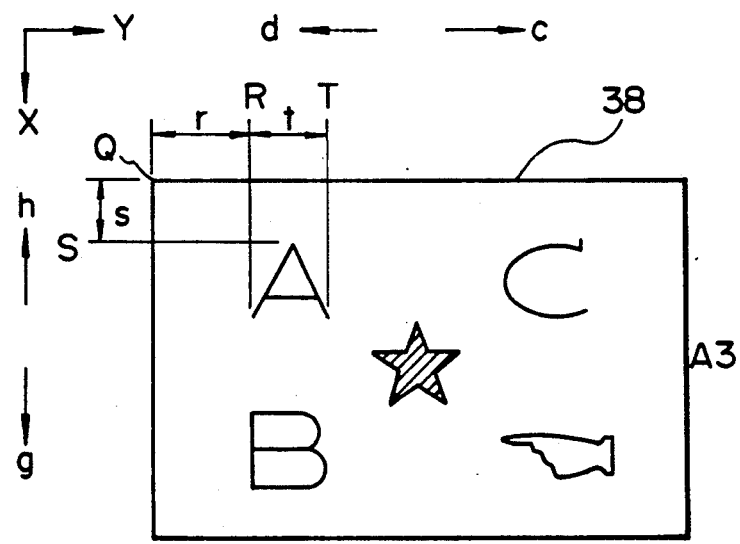
FIGS. 9A and 9B each shows a particular stencil associated with the documents and clipping shown in FIGS. 8A-8C.
Figure 9B:
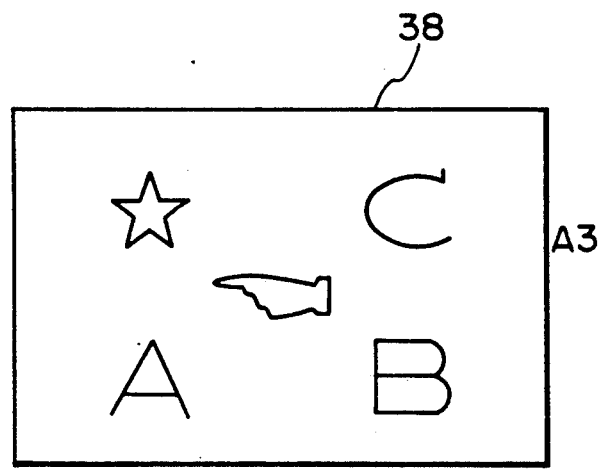

Such a modified device, generally 10A, is assumed to be operable with sizes up to A3 size. As shown in FIGS. 8A-8C, assume a document 18C of size A1, a document 18D of size A3, and a clipping 18E. The operation of the device 10A will be described on the assumption that the character the area 84 of the document 18C, the area 86 of the document 18C, the area 90 of the document 18C, the document 18D and the clipping 18E are sequentially written in the stencil 38 in this order to produce a master 38 of A3 size, as shown in FIG. 9A. The document 18C of A1 size should be written in the stencil 38 by each area corresponding to one-fourth of the A3 size.

First, the area 84 of the document 18C of size A1 is laid on the platen 20, and then the A3 key 66c is pressed. As a result, an area corresponding to the A3 size is indicated on the scale 62 of the display 52 by bold lines, as shown in FIG. 6. At this instant, the marks 60 and 84 are located at the origin Q within the frames 58 and 82, respectively. Subsequently, a specific write start position R in the subscanning direction Y is selected, and then the position key 68a is pressed to enter such a position. Specifically, the position key 68a is continuously pressed until the mark 60 moves a distance r in the direction a within the frame 58. The stencil speed switching means selects the high-speed feed mode in interlocked relation to the movement of the mark 60. Then, the platen roller 40 is rotated by the stencil moving means to drive the stencil 38 by the distance r in a direction c. As soon as the stencil 38 is moved by the distance r, the mark 60 flashes. Next, a write start position S in the main scanning direction X is selected, and then the position key 68c is pressed to enter such a position. Specifically, the position key 68c is continuously pressed until the second mark 84 moves a distance s in the direction e within the frame 82. Then, the mark 84 flashes to show that the device 10A is ready to effect a writing operation.

As the start key 70 is pressed, the light source 24 scans the document 18A by light. The resulting reflection from the document 18C is routed through the mirrors 26 and 28 and lens 30 to the CCD image sensor 32. The image sensor 32 converts the incident light to an electric signal and sends it to the controller 56. The stencil speed switching means selects the write speed mode, and the platen roller 40 is rotated to transport the stencil 38 in the direction c in response to a command from the stencil moving means. At the same time, the heating section 34a of the thermal head 34 cuts the stencil 38 by heat to write the image of the character A of the document 18C in response to an electric signal from the controller 56. On the start of writing the image A, the displaying means causes the display 52 to start displaying the particular area, where the image is being written, by dots, as shown in FIG. 3B. When the image of the document 18A is fully written in the stencil 38, the stencil 38 is moved from the write start position R to a write end position T, FIG. 9A, by a distance t in the direction c. Then, the lamp 64 is turned on to show that the writing operation has completed.

Thereafter, the area 86 of the document 18C is laid on the platen 20. This is followed by the sequence of steps described above in relation to the area 84 of the document 18C to write the character B existing in the area 86 of the document 18C in the stencil 38. Subsequently, the character C existing in the area 90 of the document 18C is written in the stencil 38 by the same procedure. Thereupon, the document 18C is removed from the platen 20 and replaced with another document 18D. The image of this document 18D is written in the stencil 38 in the same manner as the characters of the document 18C. Finally, the document 18D on the platen 20 is replaced with the clipping 18E to write the latter in the stencil 38.

If further stencil cutting operations are not necessary, the end key 72 on the operating section 54 is pressed. Then, the stencil speed switching means selects the high-speed feed mode, and the platen roller 40 is rotated by the stencil moving means to drive the stencil 38 in the direction c over a distance corresponding to the A3 size. Then, the cutter 42 cuts the stencil 38 while the roller pair 48 transports the cut length of stencil 38 to the tray 46. As the sensor 44 senses the trailing edge of the cut length of stencil 38, the resulting output thereof is sent to the controller 56. In response, the controller 56 causes the control means to hold the rest of the stencil or webbing 38 in the standby position.

In this manner, the modified device 10A produces a stencil or master 38 by repeating a writing cycle five times in total. Since the order of writing the documents 18C, 18D and 18E in the stencil 38 is open to choice, they can be laid out in a desired configuration.

As stated above, the A1 document 18C, A3 document 18D and clipping 18E can be written in any desired positions of the A3 stencil 38 repetitively a desired number of times.

It should be noted that the procedure for positioning images in the main scanning direction described above is only illustrative and may be replaced with any other suitable procedure.

As described above, the first embodiment and the modification thereof are each operable even with documents greater in size than the maximum allowable size, allow the operator to lay out documents easily while watching a display, and readily forms the images of a plurality of documents in a single stencil. Moreover, the stencil is fed at a high speed when it moves to a designated write start position or at a low speed when it is cut, reducing the time necessary for a single stencil to be completed.

SECOND EMBODIMENT

This embodiment pertains to a printer using a stencil which achieves the previously stated second object of the present invention, i.e., a printer capable of printing out a document image in a desired position of a recording medium even when the document image formed in a stencil is different in scale from the original document image.

Figure 10A:
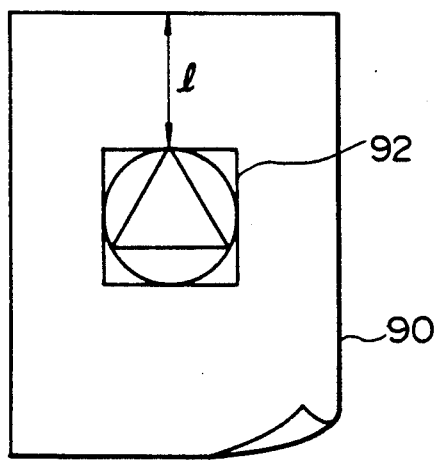
FIGS. 10A–10C are views for explaining a problem with a conventional printer which a second embodiment of the present invention eliminates.
Figure 10B:
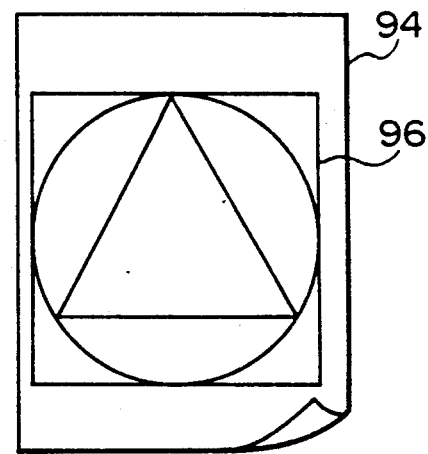
Figure 10C:
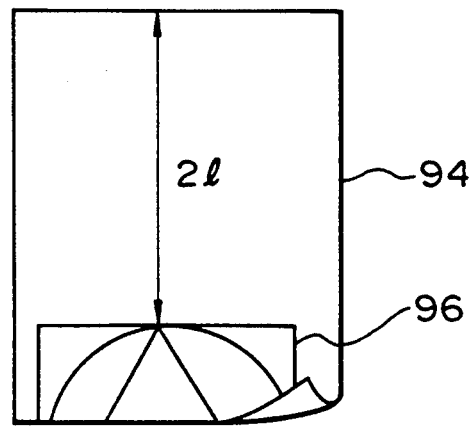

A conventional printer of the type described, e.g., a printer described in Japanese Patent Laid-Open Publication 247164/1989 reads the image of a document while transporting the document by document moving means to thereby cut a stencil, and then prints out the image on a recording medium or sheet by using the cut stencil or master. The operating timing of the document moving means is automatically shifted to reduce the margin at the leading edge of the document. As a result, the image of the document is shifted upward to maintain the same image position throughout all the printings. The problem with this kind of implementation is that when the document image is changed in magnification in the event of cutting a stencil, it will assume an unexpected position on a stencil and, therefore, on a printing. Specifically, assume that a document 90 carrying an image 92 as shown in FIG. 10A is twice enlarged. Then, as shown in FIG. 10B, the image 96 will not be printed in the central area of a sheet 94, i.e., only upper part of the image 96 will be reproduced in a lower portion of the sheet 94, as shown in FIG. 10C. While the image 90 may be rearranged by a copier or similar equipment, then formed in a stencil, and then printed out to prevent the image 96 from being partly lost on the sheet 94, such a procedure is not practicable without degrading the image. The alternative embodiment which will be described is free from the above-described problems.

Figure 11:
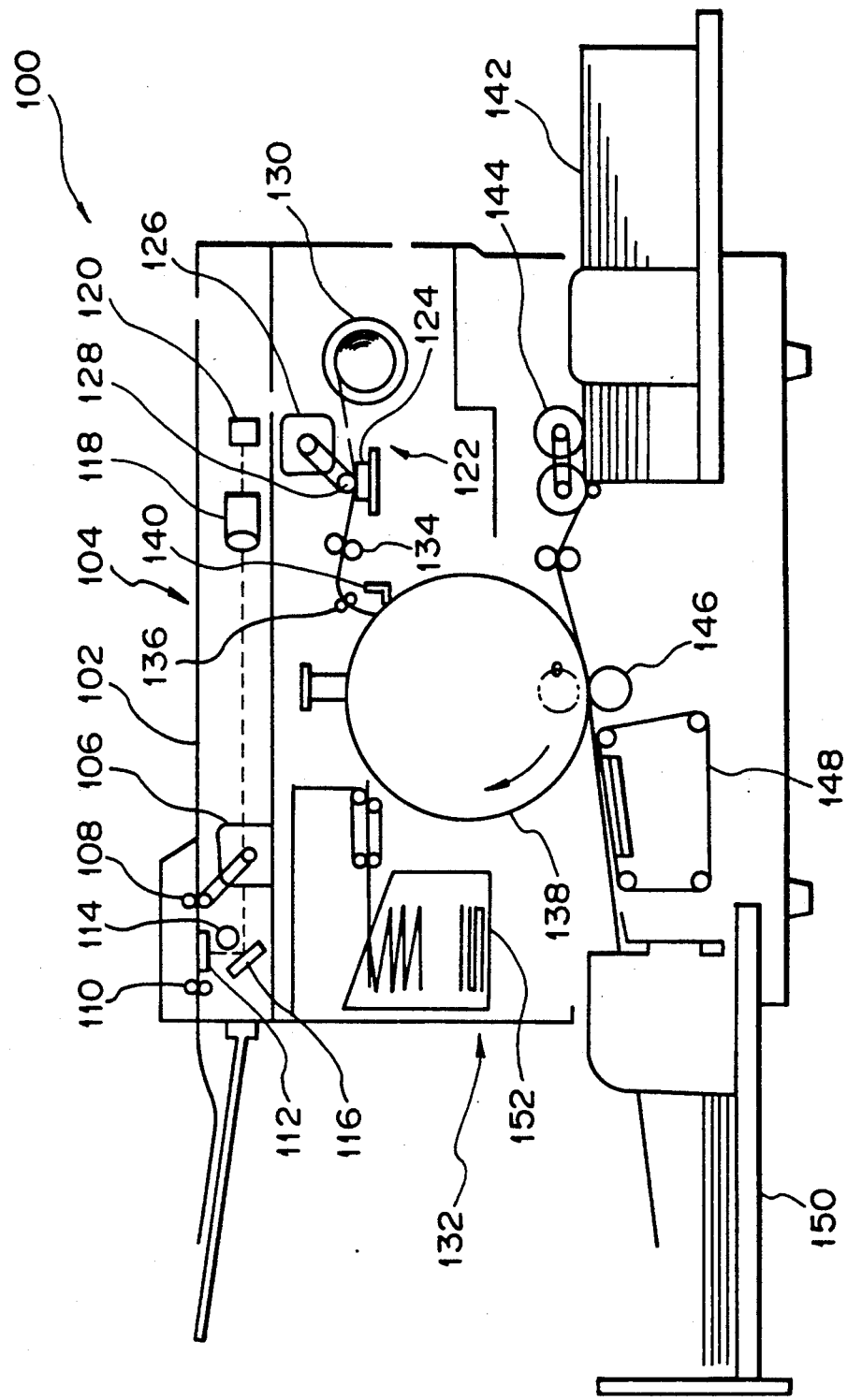
FIG. 11 is a section showing the second embodiment.

Referring to FIG. 11, a second embodiment of the present invention is shown and implemented as a printer 100. As shown, the printer 100 has a scanner 104 for scanning a document 102 which is inserted therein. In the scanner 104, when a document feed motor implemented as a pulse motor 106 is energized, feed rollers 108 and 110 are rotated to drive the document at a predetermined speed to a transparent platen 112. As the document moves along the platen 112 past a reading lines, a light source 114 illuminates it. The resulting reflection from the document is incident to a CCD image sensor 120 via a mirror 116 and a lens 118 and thereby transformed to an electric image signal. A stencil cutting section has a plotter 122 including a thermal head 124, and the scanner 104. As a stencil feed motor 126 included in the plotter 122 is energized, a platen roller 128 is rotated to pay out a stencil 130 from a roll. At the same time, the thermal head 124 writes an image in the stencil 130 in response to the image signal fed thereto from the image sensor 120 via an analog-to-digital converter (ADC) and an image processing section. The stencil 130 having been cut by the thermal head 124 is cut in a predetermined length by a cutter, not shown. Transport rollers 134 and 136 drive the cut length of stencil or master 130 to a printing section 132. In the printing section 132, a clamper 140 clamps the stencil 130. As a print drum 138 is rotated by a motor in a direction indicated by an arrow in the figure, the stencil 130 clamped by the clamper 140 is wrapped around the drum 138. Ink is supplied to the interior of the drum 138 from a reservoir, not shown, and oozes out through the holes of the drum 138 and the perforations of the stencil 130. A printing medium in the form of sheet 142 is fed by a feed roller 144. When the sheet 142 moves between the stencil 130 and a press roller 146, it is pressed with the result that the ink is transferred from the stencil 130 to the sheet 142. As a result, the image is transferred from the stencil 130 to the sheet 142. Then, the sheet or printing 142 is driven out to a tray 150 via a transporting section 148. The stencil 130 which has undergone the printing operation is released from the clamper 140 and drum 138 and then discharged to a box 152.

Figure 12:
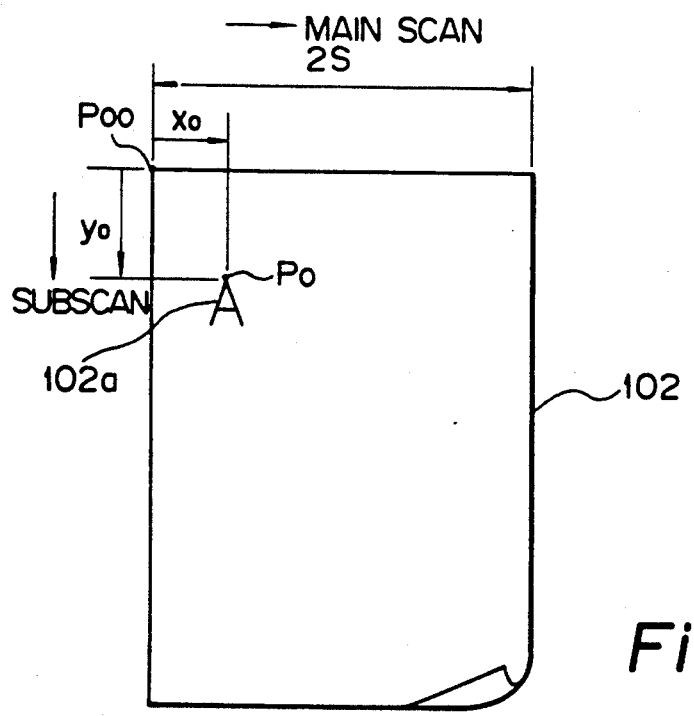
FIGS. 12A, 12B and 13 show the movement of an image occurring in the second embodiment.
Figure 12B:
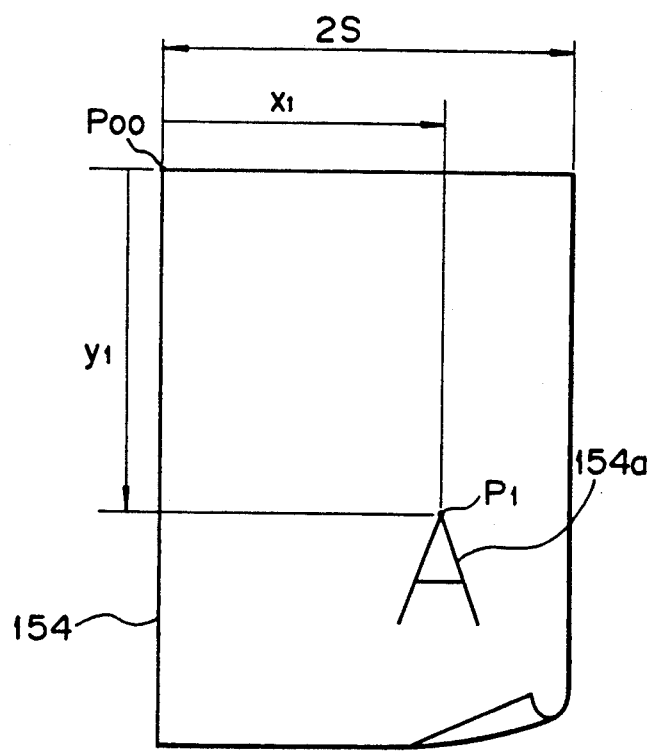

As shown in FIGS. 12A and 12B, assume that the operator desires to shift a particular point $P_0$ on a document 102 to a different point $P_1$ on a printing 154, twice enlarge the image 102a of the document 102 by using the point $P_1$ as a reference, and print out the enlarged image on the printing 154 as an image 154a. Both the document 102 and the printing 154 have a width of 2S (mm) in the main scanning direction (the scanning direction of the CCD 120 and the widthwise direction of the drum 138, respectively). The point $P_0$ is located at a distance of $x_0$ (mm) in the main scanning direction and a distance of $y_0$ (mm) in the subscanning direction (transport direction) from the upper left origin $P_{00}$ of the document 102. The point $P_1$ is locate at a distance of $x_1$ (mm) in the main scanning direction and a distance of $y_1$ in the subscanning direction (transport direction) from the upper left origin $P_{00}$ of the printing 154. The scanner 104 reads the point $P_0$ by the image sensor 120 while the plotter 122 writes it in the stencil 130 as the point $P_1$. In this instance, the shift and magnification change of the points $P_0$ and $P_1$ or the shift and magnification change of the image is carried out by an image moving means which includes first and second image movement control means, which will be discussed below. The first and second image control means will be described.

Figure 13:
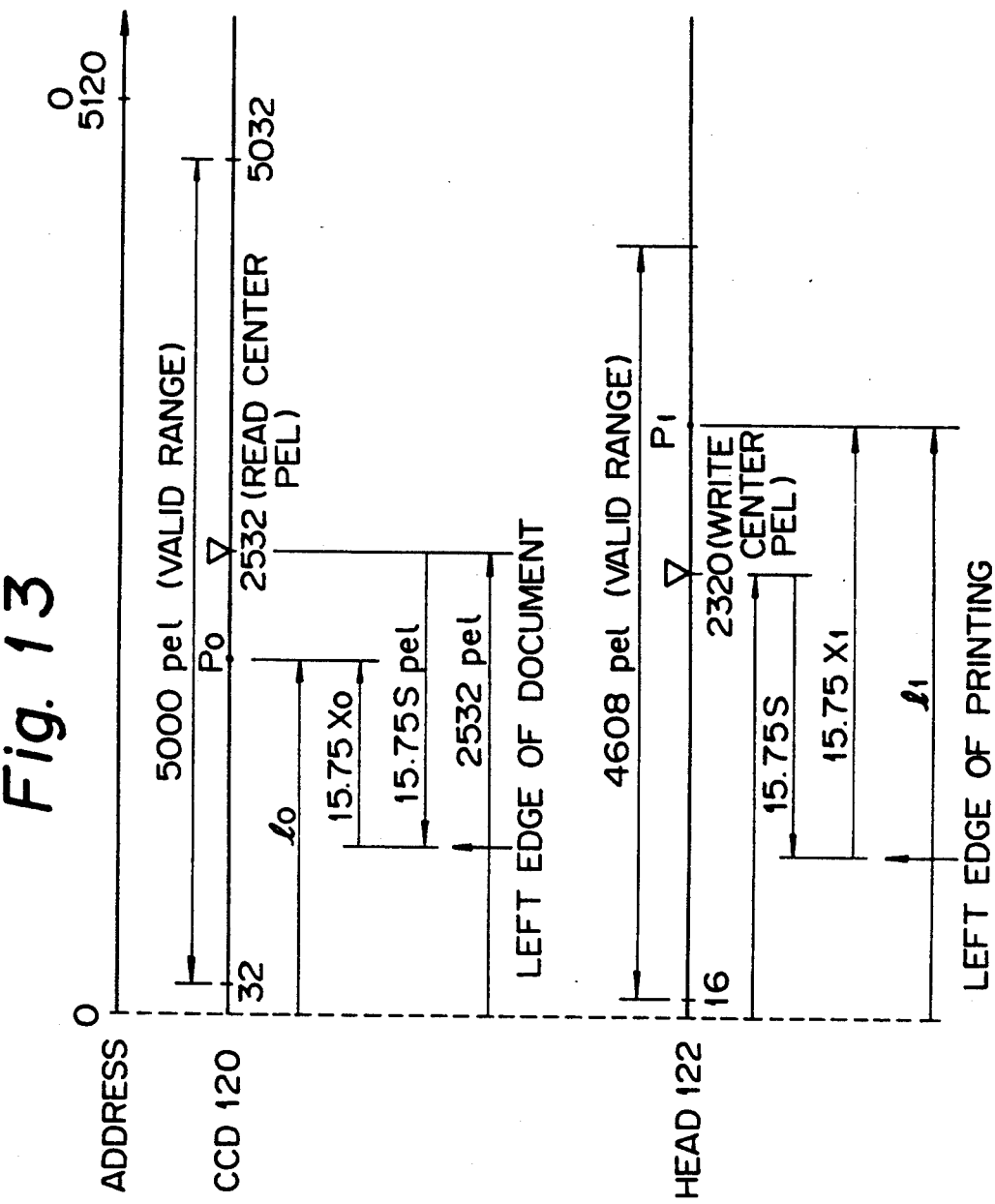

As shown in FIG. 13, the position $l_0$ where the image sensor 120 reads the point $P_0$ is represented by a unit called pel and produced by:

$$l_0 = 2532 + 15.75(x_o - S) pels$$

where 2532 indicates the center pel of the document 102 to be read, 15.75 indicates the number of pels per 1 mm (i.e. 400 dots per inch or dpi), and S indicates a dimension which is one half of the width of the document 102. In the illustrative embodiment, the number of pels in the main scanning direction, i.e., the length of one line is assumed to be 5120 ($5 \times 2^{10}$) pels. On the other hand, the position $l_1$ where the thermal head 124 records the pel of the point $P_1$ is produced by:

$$l_1 = 2320 + 15.75(x_1 - S) pels$$

where 2320 is the position of the center pel of the stencil (i.e. printing) to be written. In this manner, the pel positions of the points $P_0$ and $P_1$ are determined by $x_0$ and $x_1$, respectively.

Figure 14:
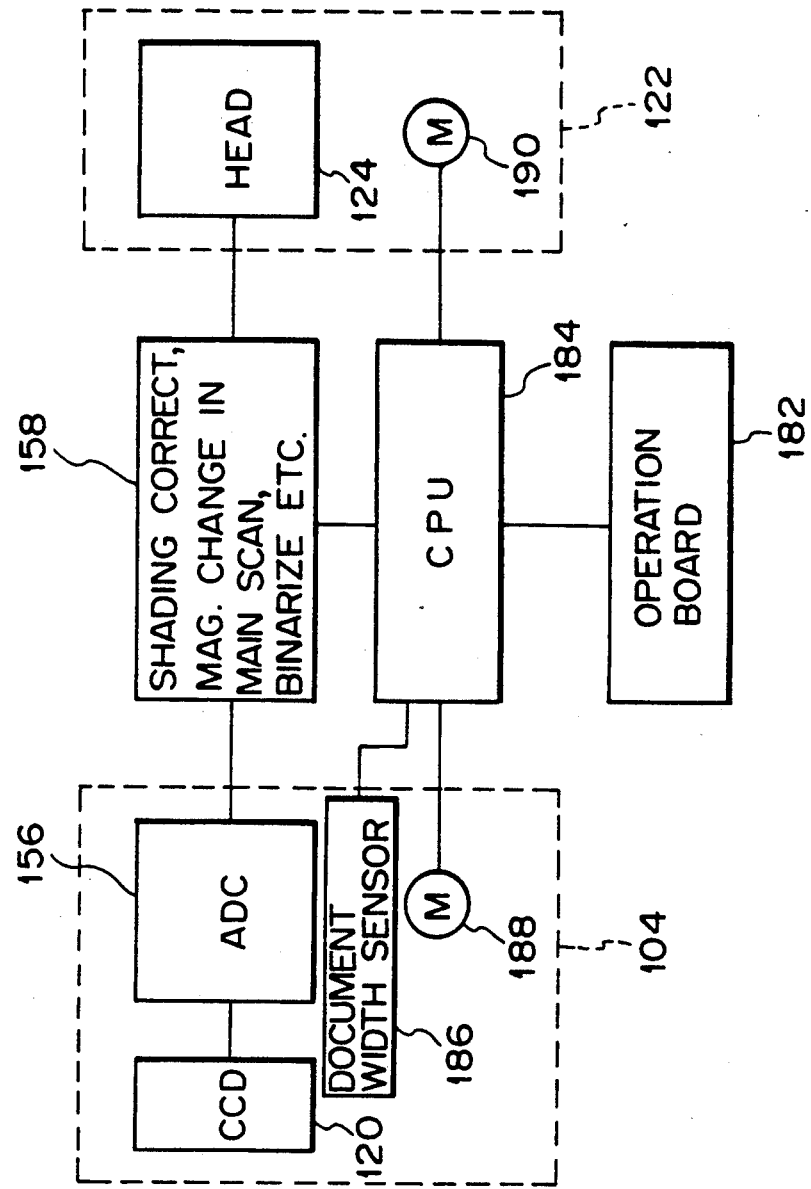
FIG. 14 is a block diagram schematically showing a control system for a printer using a stencil.

As shown in FIG. 14, the image signal from the image sensor 120 of the scanner 104, including the point $P_0$, is converted to a digital signal by an ADC 156. The digital signal is applied to an image processing section 158 to undergo shading correction, magnification change in the main scanning direction, binarization, etc. The output of the image processing section 158 is fed to the thermal head 124 of the plotter 122 to be written in the stencil 130. The shift of the image from the point $P_0$ to the point $P_1$ in the main scanning direction as stated above is executed by the first image movement control means, hereafter referred to as a main scanning direction magnification changing section which forms part of the image signal processing section 158.

Figure 15:
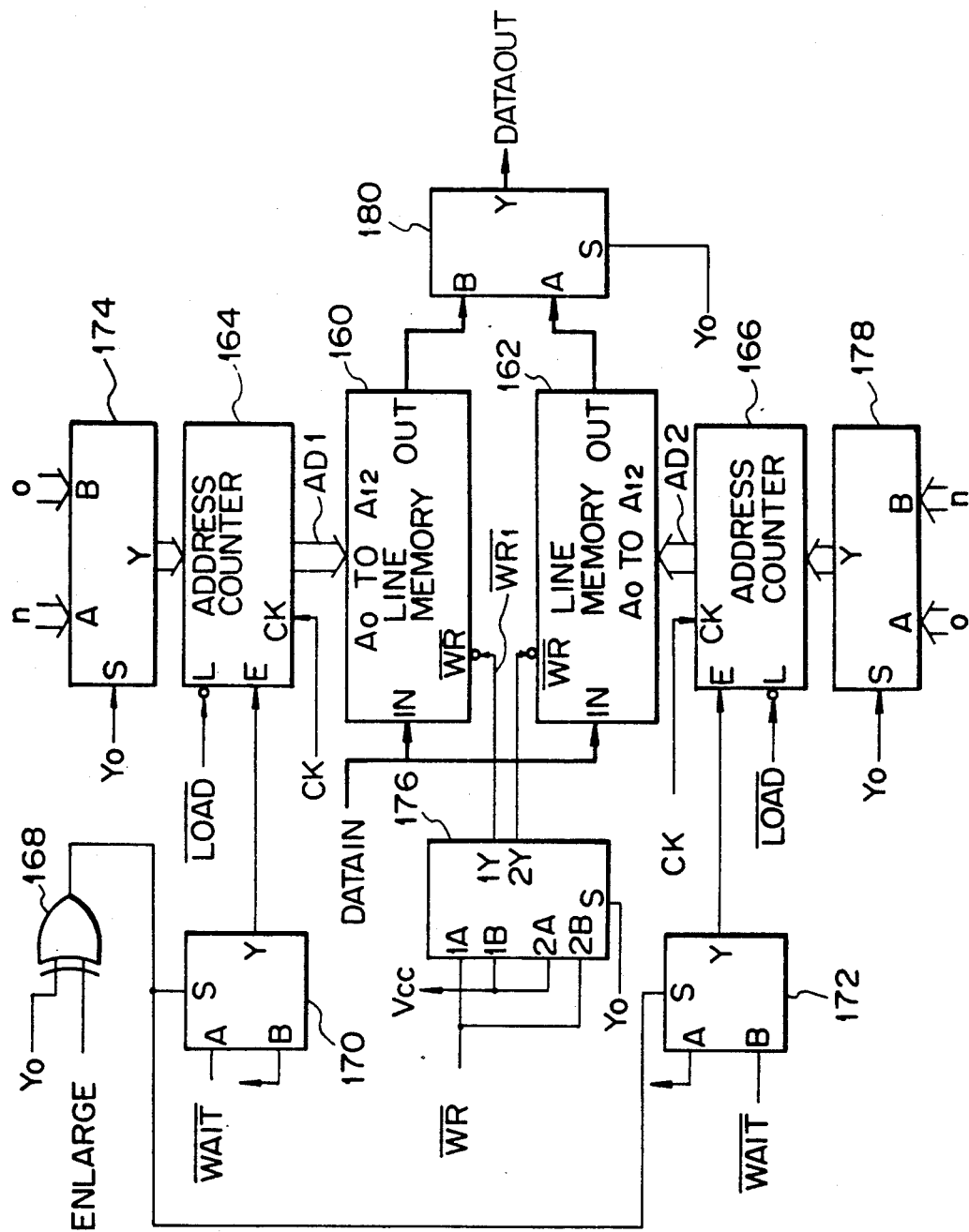
FIG. 15 is a block diagram schematically showing a specific construction of a main scanning direction magnification changing section included in the system of FIG. 14.

As shown in FIG. 15 specifically, the main scanning direction magnification changing section has two line memories 160 and 162 and serves as a toggle memory, i.e., conditions the line memories 160 and 162 for a read mode and a write mode alternately. In this section, address counters 164 and 166 generate addresses independently of each other and delivers them to the line memories 160 and 162, respectively. The address counters 164 and 166 are each constructed to allow the associated line memory 160 or 162 to load a start address for starting reading out an image signal or starting writing an image signal. The line memories 160 and 162 are loaded with the start addresses at the beginning of each period of main scanning. The address counters 164 and 166 each has 13 bits and, in an enabled state, counts a clock CK which is synchronous to the pel signal. On reaching $2^{13} = 8192$, each of the address counters 164 and 166 returns to zero and starts counting the clock CK again. The address counters 164 and 166 each is enabled when the terminal E thereof is in a high level, counting up the clock CK. When the terminal E is in a low level, each address counter 164 or 166 is disenabled to stop counting the clock CK (neglects the clock CK).

Figure 16A:
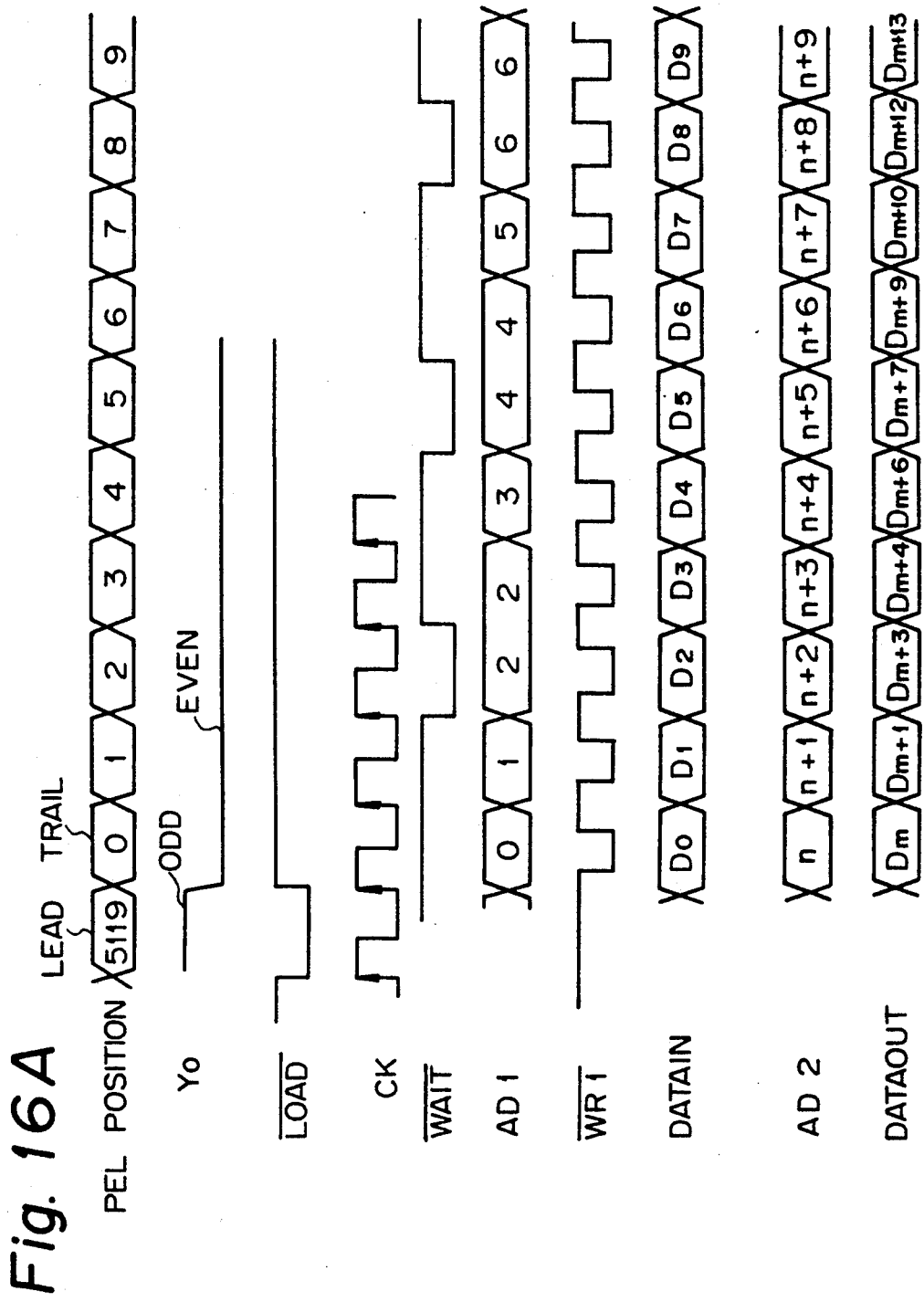

First, the operation of the main scanning direction magnification changing section will be described with reference to FIGS. 15 and 16A and on the assumption that a document image should be written in a stencil in a reduced scale.

A signal ENLARGE changes to a high level when a document image should be written in a stencil in an enlarged scale. Here, the signal ENLARGE is in a low level since the document image should be written in a reduced scale. In this condition, a signal $Y_0$ is passed through an OR gate 168 to reach terminals S of selectors 170 and 172 and is directly applied to terminals S of selectors 174, 176, 178 and 180. The selectors 170–180 each outputs the input to a terminal A thereof via a terminal Y when the terminal S is in a low level or outputs the input to a terminal B when the terminal S is in a high level. The selector 176 outputs the inputs to terminals 1A and 2A via terminals 1Y and 2Y when the terminal S is in a low level or outputs the inputs to terminals 1B and 2B via terminal 1Y and 2Y. The signal $Y_0$ indicates whether the line of a document being scanned in the main scanning direction is an odd line or whether it is an even line; it is in a high level when an odd line is scanned or in a high level when an even line is scanned. A signal $\overline{WAIT}$ periodically changes to a high level and a low level in a ratio corresponding to a magnification change ratio entered on an operation board 182, FIG. 14. The selector 170 selects either one of the signal $\overline{WAIT}$ and the high level in response to the signal $Y_0$ from an Exclusive-OR gate 168 which indicates an odd line or an even line, delivering the selected input to the terminal E of the address counter 164. The selector 172 selects the signal $\overline{WAIT}$ or the high level in response to the signal $Y_0$ from the OR gate 168 in the opposite manner to the selector 170, transferring the selected input to the terminal E of the address counter 162.

A signal $\overline{LOAD}$ changes to a low level when the last pel position (5119) of each even line of a document is main-scanned. The address counter 164 is loaded with data 0 selected by the selector 174 as a start address. As the signal $\overline{LOAD}$ changes to a high level when the last pel position (5119) of each even line of a document is subscanned by the scanner 104, the address counter 166 changes to a high level and is loaded with data n selected by the selector 178 as a start address. A signal WR periodically changes to a high level and a low level in synchronism with the main scanning of each pel of the documents 102. The selector 176 selects the signal WR or the high level depending on the line being main-scanned, i.e., an odd line or an even line and transfers it to the line memory 160. At the same time, the selector 176 selects the signal $\overline{WAIT}$ or the high level depending on the signal $Y_0$ indicative of an odd line or an even line and delivers it to the line memory 162 in the opposite relation to the output to the line memory 160. As a result, when the scanner 104 scans an even line of a document, an image signal DATAIN from the image sensor 120 is written to the line memory 160 while an image signal written to the line memory 162 during the scanning of an odd line (preceding line) is read out of the memory 162 and outputted via the selector 180. At this instant, the address counter 164 receives the signal $\overline{WAIT}$ at the terminal E thereof via the selector 170 and, when the signal $\overline{WAIT}$ is in a low level, stops counting. As a result, the output signal AD1 of the address counter 164 changes, as shown in FIG. 16A. The line memory 160, therefore, writes one pel signal in a given address and then writes the next pel signal in the same address over the preceding pel signal. In this manner, the image signal DATAIN from the image sensor 120 is thinned to, for example, two-thirds in matching relation to the magnification change ratio, whereby the image is reduced in the main scanning direction.

The address counter 166 does not stop counting since the signal fed to the terminal E thereof from the selector 172 remains in a high level. Hence, the address counter 166 counts the clock CK continuously in an ordinary manner, using n as a start address. This causes the line memory 162 to read the image signal written thereto in a reduced scale and representative of the preceding line, according to the count of the address counter 166. When the scanner 104 main-scans an odd line of a document, the image signal DATAIN from the image sensor 120 is written to the line memory 162 while the image signal written to the line memory 160 during the main-scanning of an even line (preceding line) is read out of the line memory 160 and delivered via the selector 180. In this case, the address counter 162 receives the signal $\overline{WAIT}$ at the terminal E thereof via the selector 172 and, when the signal WAIT is in a low level, stops counting. As a result, the output signal AD2 of the address counter 166 changes, as shown in FIG. 16A. The line memory 162, therefore, writes a given pel signal in a given address and then writes the next pel signal in the same address over the preceding pel signal. Consequently, the image signal DATAIN from the image sensor 120 is thinned to, for example, two-thirds in matching relation to the magnification change ratio, reducing the image in the main scanning direction. The address counter 164 does not stop counting since the signal fed from the selector 170 to the terminal E thereof is in a high level, counting the clock CK one by open by using n as a start address. Hence, the image signal written to the line memory 160 in a reduced scale and representative of the preceding line is read out according to the count of the address counter 164. In this manner, the image signal DATAIN from the image sensor 120 is written to the line memories 160 and 162 alternately while being thinned on the basis of the magnification change ratio and is read thereout of alternately to be delivered via the selector 180.

The main scanning direction magnification changing section allows a document image to be written in a stencil in an enlarged scale, as will be described with reference to FIGS. 15 and 16B.

To write a document image in a stencil in an enlarged scale, the signal ENLARGE changes to a high level while the signal $Y_0$ is inverted by the OR gate 168 and then applied to the terminals S of the selectors 170 and 172. As a result, the signal $\overline{WAIT}$ is applied to the address counters 164 and 166 in the opposite relation to the reduction mode. Specifically, when an even line of a document is main-scanned by the scanner 104, the address counter 164 counts the clock CK one by one from zero with the result that the image signal DATAIN from the image sensor 120 is written to the line memory 160. On the other hand, the address counter 166 receives the signal $\overline{WAIT}$ at the terminal E thereof via the selector 172 and, when the signal $\overline{WAIT}$ is in a high level, counts the clock CK from the start address n. When the signal $\overline{WAIT}$ is in a low level, the address counter 166 stops counting and changes the output signal AD2 thereof, as shown in FIG. 16B. As a result, the line memory 162 reads out a given pel signal and then reads the same pel signal again out out of the same address. Consequently, the image signal is enlarged to, for example, three-seconds in the main scanning direction in matching relation to the magnification change ratio.

When the scanner 104 scans an odd line of a document, the address counter 164, receiving the signal $\overline{WAIT}$ via the selector 170 at the terminal E, counts the clock CK from the starts address when the signal $\overline{WAIT}$ is in a high level. When the signal $\overline{WAIT}$ is in a low level, the address counter 164 stops counting the clock CK. As a result, the line memory 160 reads one pel signal out of a given address and then reads the same pel signal again out of the same address, thereby enlarging the image signal in the main scanning direction to, for example, three-seconds. The address counter 166 counts the clock CK one by one from zero in an ordinary manner, so that the image signal DATAIN from the image sensor 120 is written to the line memory 162 as it is. As stated above, the image signal DATAIN is written to the line memories 160 and 162 alternately as it is while the image signal DATAIN is read out of the line memories 160 and 162 alternately in an enlarged scale matching the magnification change ratio.

In the above-described manner, while an image signal is read out of the line memories 160 and 162 from the start address n first, the start address n is set in association with the desired magnification change ratio. As a result, the point $P_0$ on the document 102 is shifted to the point $P_1$ on the printing 154, i.e., the pel signal at the point $P_1$ is read out of the line memories 106 and 162 at the adequate timing of pel position $l_1$.

How a document image is moved will be described by taking printing in a reduced scale as an example.

Figure 17:
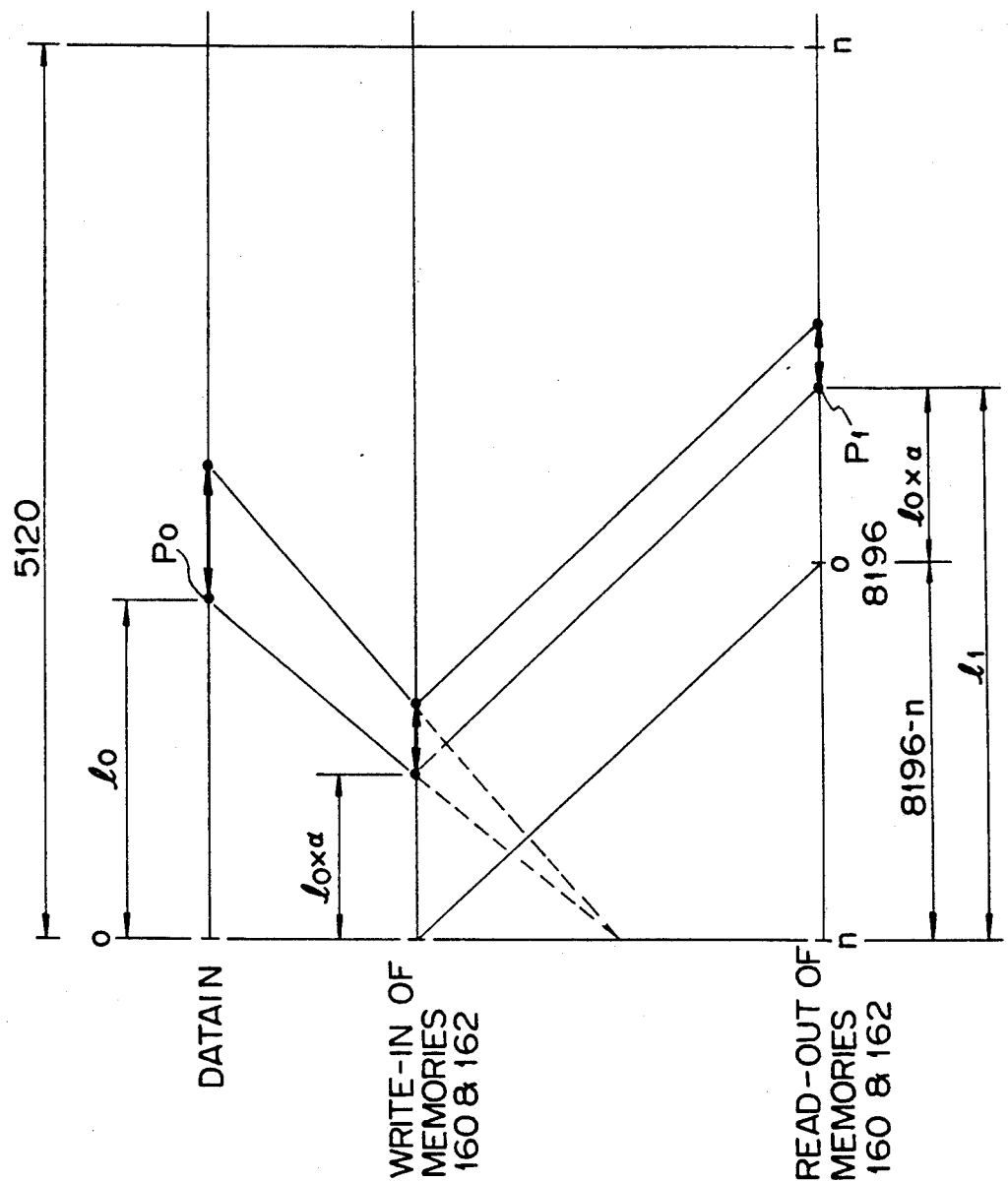
FIGS. 17 and 18 show the movement of an image in the main scanning direction.

As shown in FIG. 17, assume that the pel positions of the points $P_0$ and $P_1$ are $l_0$ and $l_1$, respectively. When the image signal DATAIN is written to the line memory 160 or 162, it is thinned in matching relation to the magnification change ratio with the result that the pel signal representative of the point $P_0$ is written to an address $l_0 \times \alpha$ ($\alpha$: magnification change ratio) in the line memory 160 or 162. At the time when such a pel signal is read out of the line memory 160 or 162, the start address n is set up in association with the magnification change ratio $\alpha$ and other factors. The pel signal of the point $P_0$ is read out of the line memory 160 or 162 at the timing of a pel position corresponding to the point $P_1$. The start address n is calculated by a calculating means from $\alpha$, $l_0$ and $l_1$, as follows:

$$n = \alpha l_0 - l_1 + 8196$$

Since $l_0$ $l_1$ are determined as stated earlier $$n = \alpha\{2532 + 15.75 (x_0 - S)\} - \{2320 + 15.75 (x_1 - S)\} + 8196$$

When n is equal to or greater than 8196, (n−8196) is selected as n. By so determining n on the basis of the positions $x_0$ (mm) and $x_1$ (mm) on the document 102 and the printing 154, respectively, it is possible to move the image of the document 102 such that the point $P_0$ coincides with the point $P_1$.

Figure 18:
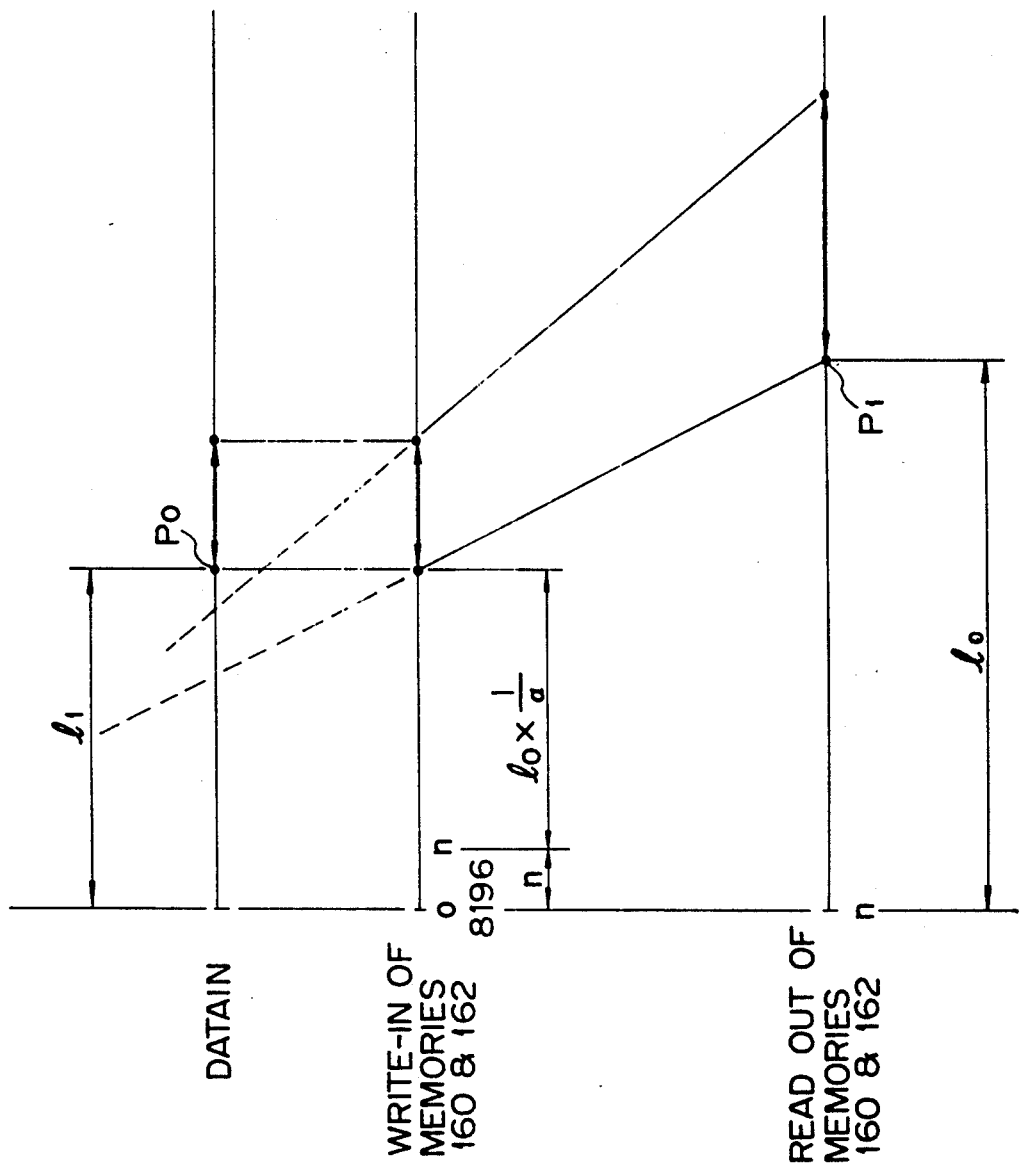

To print out an image in an enlarged scale, it is moved by the following procedure. As shown in FIG. 18, to move the point $P_0$ on the document 102 to the point $P_1$ on the printing 154, the image data DATAIN is written to the line memories 160 and 162 as it is. When the image data DATAIN is read out of the memories 160 and 162, the up-counting of the address is intermittently stopped with the result that part of the data DATAIN overlaps when read out. As shown in FIG. 18, the start address n is set in matching relation to the magnification change ratio $\alpha$ and other factors in the event of readout. Hence, the pel signal of the point $P_0$ is read out of the line memory 160 or 162 at the timing of a pel position corresponding to the point $P_1$. The start address n is produced from $\alpha$, $l_0$ and $l_1$, as follows:

$$n = l_1 - l_0 / | \alpha$$

Since $l_0$ and $l_1$ are determined as stated earlier, $$n = \{2320 + 15.75(x_1 - S)\} - \{2532 + 15.75(x_0 - S)\}/\alpha$$

If n is smaller than zero, (n+8196) will be selected as n. In this manner, the image of the document 102 can be enlarged by being moved such that the point $P_0$ thereof coincides with the point $P_1$ of the printing 154.

Hereinafter will be described the movement of an image in the subscanning direction, i.e., the second image movement control means.

Figure 19A:
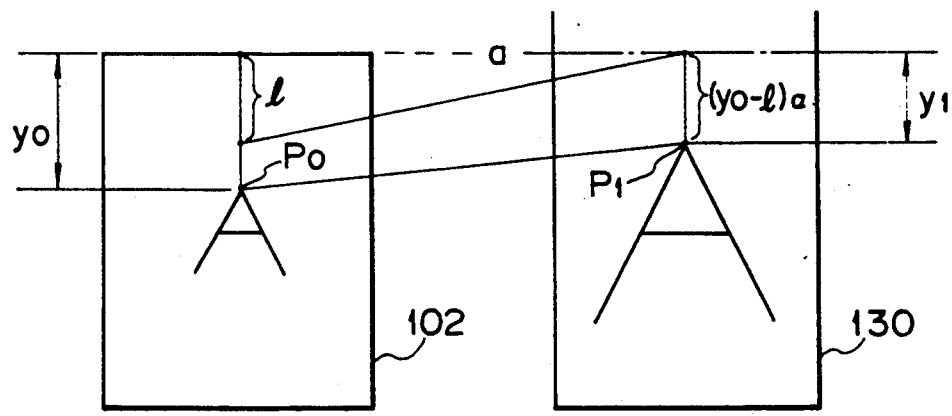
FIGS. 19A and 19B show the movement of an image in the subscanning direction.
Figure 19B:
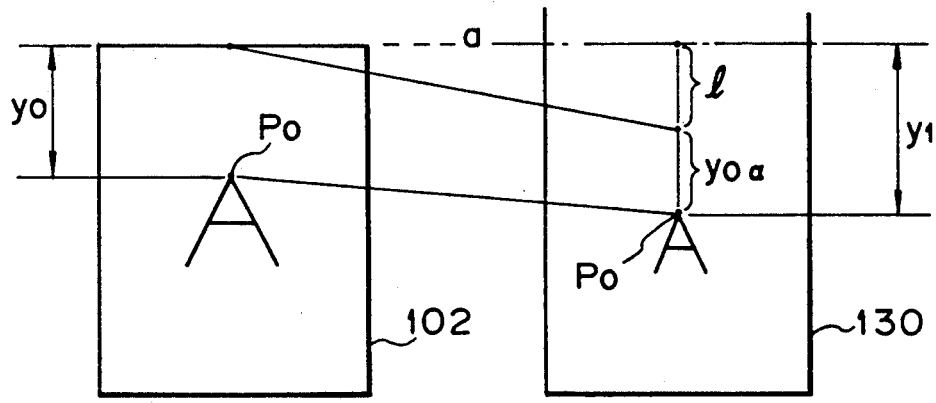
Figure 20A:
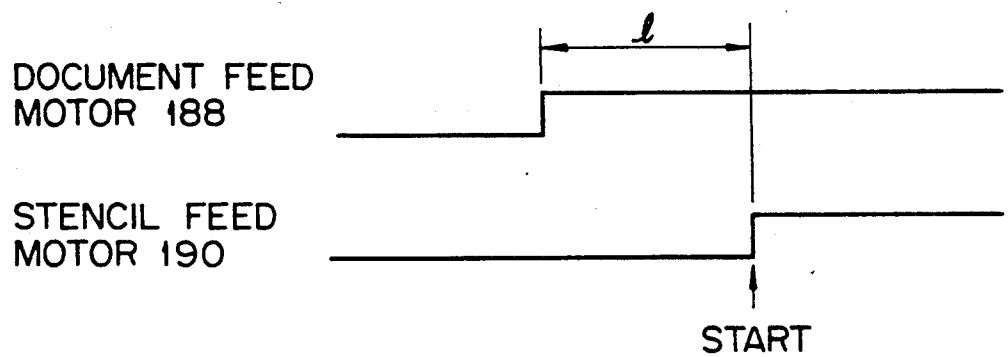
FIGS. 20A–20C are timing charts representative of the operation of a document feed motor and that of a stencil feed motor.
Figure 20B:
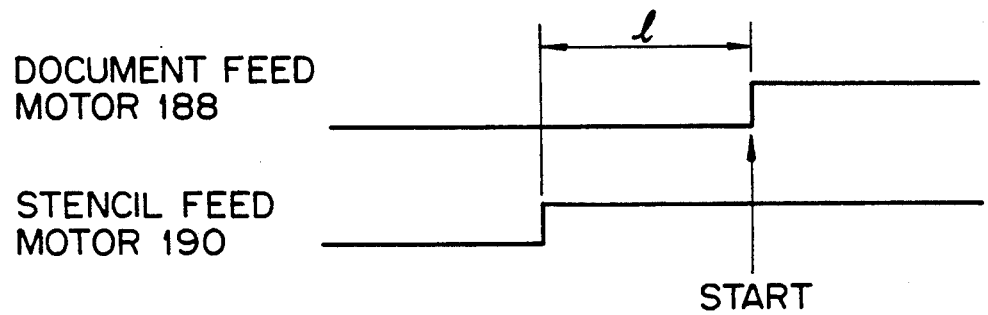
Figure 20C:
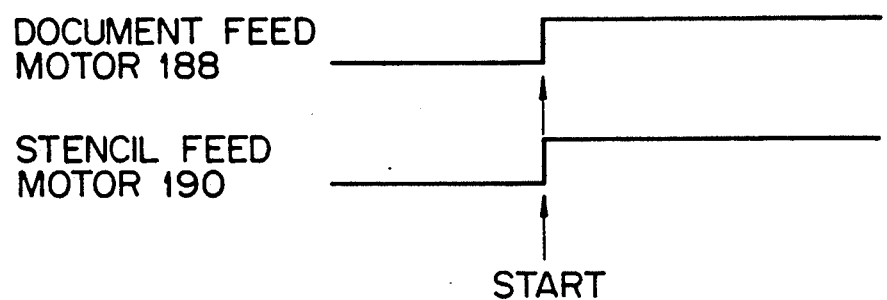

In an ordinary stencil cutting mode which does not move an image, an image positioned at the leading edge of the document 102 is written in the stencil 130 from a line a, FIGS. 19A and 19B. As shown in FIG. 14, a microcomputer (CPU) 184 controls a document feed motor 188 and a stencil feed motor 190 in response to a magnification $\alpha$ entered on the operation board 182, a document width signal from a document width sensor 186, etc. As shown in FIG. 20C, the CPU 184 turns on the motors 188 and 190 at the same time. The transport speed of the stencil 130 is determined by the dot density particular to the thermal head 124 and the time necessary for one line of image to be formed in the stencil 130; the stencil 130 is transported at a constant speed with no regard to the magnification $\alpha$. On the other hand, the document 102 is transported at the same speed as the stencil 130 when the magnification of the document 102 is x1. When the magnification is other than x1, the CPU 184 changes the speed of the document feed motor 188, i.e., the transport speed of the document 102 in association with the magnification $\alpha$, thereby changing the magnification in the subscanning direction. For example, when the magnification change ratio is 200%, the transport speed of the document 102 is halved, compared to a magnification x1; when the former is 50%, the latter is doubled. The document width sensor 186 determines the width of the document 102 whose image should be read by the scanner 104. It is therefore seen that the second image movement control means includes CPU 184, feed motors 188, 190, document width sensor 186 and operation board 182.

As shown in FIG. 19A, assume that an image positioned at the point of the document 102 which is l (mm) advanced from the ordinary point should be positioned at the line a of the stencil 130. Then, as shown in FIG. 20A, the CPU 184 energizes the document feed motor 188 later than the stencil feed motor 190 by a time corresponding to the distance l (mm), advancing the point $P_1$ than the point $P_0$. In this case, since the image extending over a distance $y_0$ (mm) on the document 102 in the subscanning direction is moved to a distance $y_1$ (mm) on the printing 130, $$(y_0 - l)\alpha = y_1$$

Therefore,
$$l = y_0 - y_1/\alpha$$

As shown in FIG. 19B, assume that the image at the leading image of the document 102 begins to be formed in the stencil 130 at a point where the stencil 130 has been transported by the distance l (mm). Then, the CPU 184 turns on the document feed motor 188 later than the stencil feed motor 190 by a time corresponding to the distance l (mm), advancing the point $P_1$ than the $P_0$ in the subscanning direction. In this case, $$l + y_0\alpha = y_1$$

Therefore, $$l = y_1 - y_0\alpha$$

Figure 21:
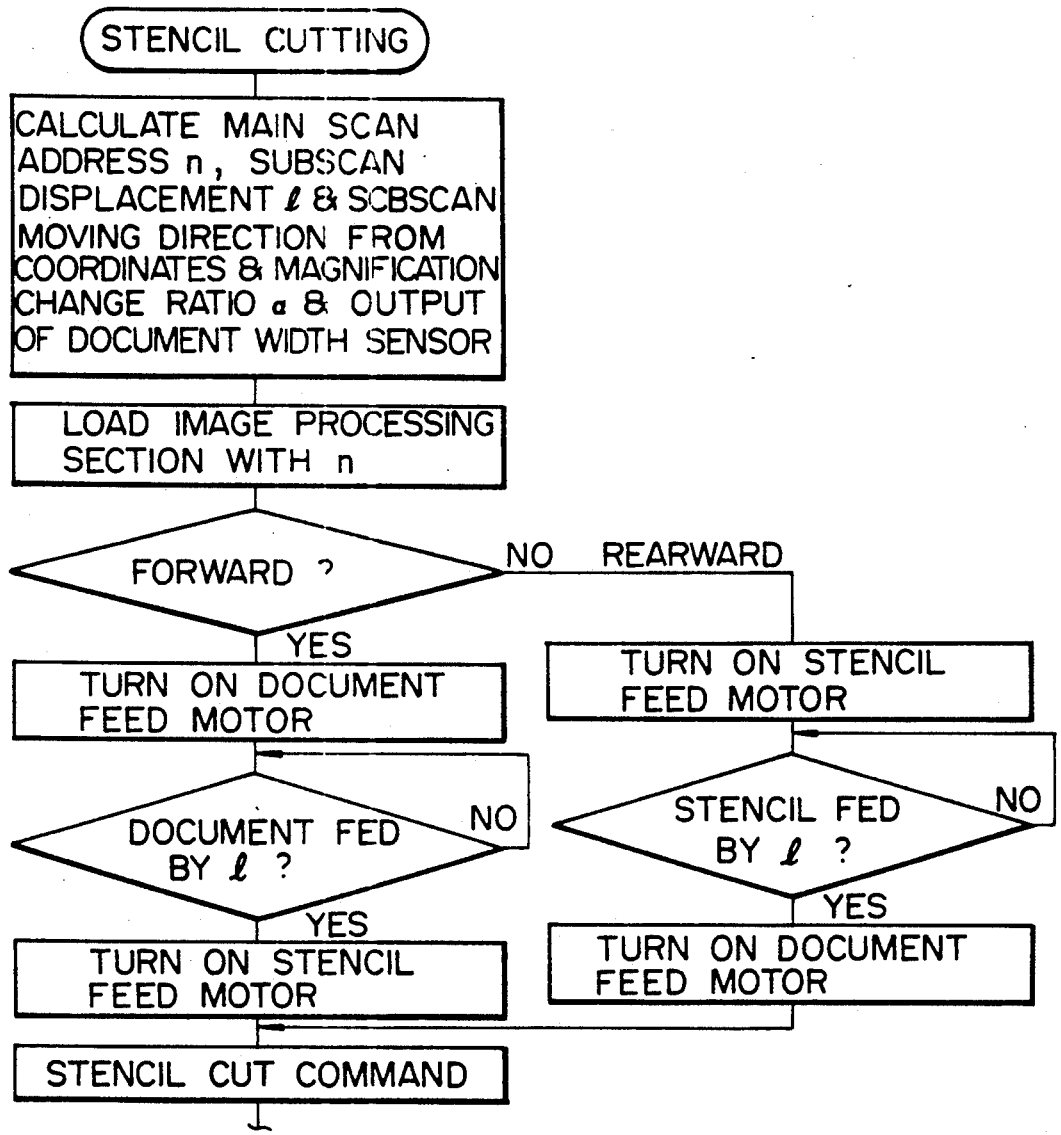
FIGS. 21 is a flowchart demonstrating a specific operation of a CPU included in the system shown in FIG. 14.

Referring to FIG. 21, a specific operation of the CPU 184 will be described. When the user desires to move and change the magnification of the image of the document 102 on a printing, the user manipulates the operation board 182 to mark the desired point $P_0$ of the document 102 by coordinates as a first observed point, to mark the point $P_1$ where the first observed point should be reproduced on a printing by coordinates as a second observed point, and to enter a desired magnification change ratio $\alpha$. The CPU 184 determines a start address n in the main scanning direction and a displacement l in the subscanning direction by substituting $P_0$, $P_1$ and $\alpha$ entered on the operation board 182 for the previously stated equations. At the same time, the CPU 184 determines a direction in which the image should be moved in the subscanning direction (forward or rearward). Then, the CPU 184 loads the image signal processing section 158 with such values and direction and deliver them to the selector 174 and 178, thereby moving the image in the main scanning direction. For this purpose, the CPU 184 feeds the previously stated signals $Y_0$, ENLARGE, $\overline{WAIT}$ and $\overline{LOAD}$ to the image signal processing section 158. Further, when the image should be moved forward in the subscanning direction, the CPU 184 turns on the document feed motor 188 and, after the document 102 has moved the distance 1 (mm) in the subscanning direction, turns on the stencil feed motor 190. At the same time, the CPU 184 sends a command to the plotter 122 for causing it to start cutting the stencil 130. As a result, the document image is written in the stencil 130 in an advanced position in the subscanning direction. When the document image should be moved rearward, the CPU 184 turns on the stencil feed motor 190 and, after the stencil 130 has moved the distance 1 (mm) in the subscanning direction, turns on the document feed motor 188 while sending a start command to the plotter 122. Consequently, the document image is formed in the stencil 130 in a retarded position in the subscanning direction. It is therefore seen that CPU 184 includes a means for supervising the amount of feed of a document and the amount of feed of the stencil in the subscanning direction, a speed changing means for changing the feed speed of a document in matching relation to a magnification change ratio, a calculating means for calculating a displacement of the stencil, and a timing changing means for changing the point at which an image is formed in the stencil in matching relation to the displacement of the stencil.

While the illustrative embodiment uses coordinates in marking the points $P_0$ and $P_1$, it may use tablets or similar implement for the same purpose. The points $P_0$ and $P_1$ may be marked either before or after the entry of the magnification $\alpha$.

Figure 22:
FIG. 22 is a block diagram schematically showing the principle of the present invention.

FIG. 22 is a block diagram schematically showing the principle of the present invention.

In summary, the second embodiment described above allows a document image to be located in a desired position on a printing even if it has been changed in magnification.

Various modifications will become possible for those skilled in the art after receiving the teachings of the present disclosure without departing from the scope thereof.

What is claimed is:

1. A device for writing image information in desired positions of a single stencil, wherein said image information is read from a plurality of documents, said device comprising:
   reading means for sequentially reading image information from a plurality of documents;
   writing means for writing said image information read by said reading means in said desired positions of said stencil;
   supporting means for supporting said stencil in a manner such that said stencil is movable in a subscanning direction which is perpendicular to a main scanning direction of the stencil;
   stencil moving means for moving said stencil in said subscanning direction;
   displaying means having a display for displaying a write start position indicating a position where said image information read by said reading means begins to be written in said desired positions of said stencil and an area of said stencil where an operation for writing said information read by said reading means is under way;
   marking means for selecting and designating said write start position on an operation board; and
   control means connected to said reading means, said writing means, said displaying means and said stencil moving means for controlling said reading means, said writing means, said displaying means and said stencil moving means such that said writing operation is repetitively effected a desired number of times in said desired positions of said stencil.

2. A device as claimed in claim 1, wherein said control means controls said stencil moving means such that said stencil selectively moves at one of at least two speeds at which said stencil can be moved.

3. A device as claimed in claim 1, wherein said marking means designates said write start position in at least one of the subscanning direction and the main scanning direction perpendicular to said subscanning direction.

4. A device as claimed in claim 1, wherein said writing means writes said image information in said desired positions of said stencil while changing the magnification of said image information.

5. A device as claimed in claim 1, wherein said stencil moving means moves said stencil in a reciprocating motion in the subscanning direction.

6. A device as claimed in claim 1, wherein said marking means designates said write start position by moving a mark which appears on said display of said displaying means.

7. A printer for reading image information from a document, comprising:
   writing means for writing said image information in a stencil by cutting said stencil;
   printing means for printing out said image information in a predetermined position of a recording medium by said stencil having been cut;
   reading means for reading said image information from said document;
   marking means for marking a desired point on a document as a first observed point, and a position where said first observed point should be reproduced on a printing as a second observed point; and
   image moving means for moving an image carried on said document such that a pel of said first observed point on said document coincides with a pel of said second observed point on said printing.

8. A printer as claimed in claim 7, further comprising magnification changing means for changing the magnification of said image information.

9. A printer as claimed in claim 8, wherein said image moving means comprises first image movement control means for controlling the movement of said image performed by said image moving means in a main scanning direction.

10. A printer as claimed in claim 9, wherein said first image movement control means comprises:
    two line memories;
    address counters each being associated with respective one of said line memories for loading a count start address independently of the other address counter, and intermittently stopping up-counting the address on the basis of a magnification change ratio; and
    calculating means for calculating a start address by using said first and second observed points.

11. A printer as claimed in claim 8, wherein said image moving means further comprises second image movement control means for controlling the movement of said image performed by said image moving means in a subscanning direction which is perpendicular to the main scanning direction.

12. A printer as claimed in claim 11, wherein said second image movement control means includes a microprocessor which comprises:

supervising means for supervising the amount of feed of a document and the amount of feed of a stencil in said subscanning direction;

speed changing means for changing the feed speed of a document in matching relation to a magnification change ratio;

calculating means for calculating a displacement of the stencil by using said first and second observed points and a magnification change ratio; and timing changing means for changing the timing for starting forming an image in a stencil in matching relation to said displacement of the stencil.

* * * * *